(12) United States Patent  (10) Patent No.: US 8,547,200 B2
Han et al.  (45) Date of Patent: Oct. 1, 2013

(54) HOME APPLIANCE AND METHOD FOR OPERATING THE SAME

(75) Inventors: Jonghye Han, Changwon-si (KR); Inhaeng Cho, Changwon-si (KR); Phaljin Lee, Changwon-si (KR); Hoijin Jeong, Changwon-si (KR)

(73) Assignee: LG Electronics Inc., Seoul (KR)

( * ) Notice: Subject to any disclaimer, the term of this patent is extended or adjusted under 35 U.S.C. 154(b) by 373 days.

(21) Appl. No.: 12/850,240

(22) Filed: Aug. 4, 2010

(65) Prior Publication Data

US 2011/0032072 A1    Feb. 10, 2011

(30) Foreign Application Priority Data

Aug. 5, 2009  (KR) .......................... 10-2009-0072104
Aug. 5, 2009  (KR) .......................... 10-2009-0072107

(51) Int. Cl.
*G08B 29/00*  (2006.01)
(52) U.S. Cl.
USPC ........................................... 340/5.1; 340/679
(58) Field of Classification Search
USPC ........................................................... 340/5.1
See application file for complete search history.

(56) References Cited

U.S. PATENT DOCUMENTS

| | | |
|---|---|---|
| 3,910,322 A | 10/1975 | Hardesty et al. |
| 4,766,505 A | 8/1988 | Nakano et al. |
| 4,897,659 A | 1/1990 | Mellon |
| 4,977,394 A | 12/1990 | Manson et al. |
| 5,103,214 A | 4/1992 | Curran et al. |
| 5,210,784 A | 5/1993 | Wang et al. |
| 5,268,666 A | 12/1993 | Michel et al. |
| 5,452,344 A | 9/1995 | Larson |
| 5,506,892 A | 4/1996 | Kojima et al. |
| 5,757,643 A | 5/1998 | Kuroda et al. |
| 5,774,529 A | 6/1998 | Johannsen et al. |
| 5,864,828 A | 1/1999 | Atkins |
| 5,940,915 A * | 8/1999 | Nam ................................. 8/159 |
| 5,987,105 A | 11/1999 | Jenkins et al. |

(Continued)

FOREIGN PATENT DOCUMENTS

| | | |
|---|---|---|
| CN | 1212304 | 3/1999 |
| CN | 1393672 | 1/2003 |

(Continued)

OTHER PUBLICATIONS

International Search Report dated Dec. 18, 2009 (Application No. PCT/KR2009/002288).

(Continued)

*Primary Examiner* — Brian Zimmerman
*Assistant Examiner* — Omer S Khan
(74) *Attorney, Agent, or Firm* — KED & Associates LLP

(57) ABSTRACT

A home appliance and a method for operating the same are provided. The home appliance outputs product information as a predetermined sound signal and the sound signal is transmitted to a remote service center over a communication network so that the state of the home appliance is easily checked at the service center. Data associated with each operation of the home appliance is stored as product information according to the operation state of the home appliance. The product information is also stored when the operation is suddenly terminated and is then output as a sound signal so that it is possible to correctly check the state of the home appliance and to correctly diagnose an error that has occurred in the home appliance.

8 Claims, 11 Drawing Sheets

(56) References Cited

U.S. PATENT DOCUMENTS

| | | | |
|---|---|---|---|
| 6,121,593 A | 9/2000 | Mansbery et al. | |
| 6,759,954 B1 | 7/2004 | Myron et al. | |
| 6,763,458 B1 | 7/2004 | Watanabe et al. | 713/100 |
| 6,778,868 B2 | 8/2004 | Imamura et al. | |
| 6,870,480 B2 | 3/2005 | Suzuki et al. | |
| 6,906,617 B1 | 6/2005 | Van der Meulen | |
| 7,135,982 B2 | 11/2006 | Lee | 340/635 |
| 7,266,164 B2 | 9/2007 | Jeon et al. | |
| 7,280,643 B2 | 10/2007 | Howard et al. | 379/93.37 |
| 7,337,457 B2 | 2/2008 | Pack et al. | 725/40 |
| 7,439,439 B2 | 10/2008 | Hayes et al. | 84/600 |
| 7,509,824 B2 | 3/2009 | Park et al. | 68/12.23 |
| 7,648,476 B2 | 1/2010 | Bock et al. | |
| 7,653,512 B2 | 1/2010 | Cheung et al. | 702/184 |
| 7,843,819 B1 | 11/2010 | Benveniste | |
| 7,965,632 B2 | 6/2011 | Sugaya | |
| 8,027,752 B2 | 9/2011 | Castaldo et al. | |
| 8,040,234 B2 | 10/2011 | Ebrom et al. | 340/531 |
| 8,045,636 B1 | 10/2011 | Lee et al. | |
| 8,132,049 B2 | 3/2012 | Yasukawa et al. | |
| 8,204,189 B2 | 6/2012 | Rhodes et al. | |
| 8,391,255 B2 | 3/2013 | Ribiere et al. | |
| 2002/0029575 A1 | 3/2002 | Okamoto | |
| 2002/0032491 A1 | 3/2002 | Imamura et al. | |
| 2002/0078742 A1 | 6/2002 | Kim | 73/162 |
| 2002/0097161 A1 | 7/2002 | Deeds | |
| 2002/0116959 A1* | 8/2002 | Ohta et al. | 68/12.27 |
| 2002/0120728 A1 | 8/2002 | Braatz et al. | |
| 2003/0028345 A1 | 2/2003 | Watkins et al. | |
| 2003/0128850 A1 | 7/2003 | Kimura et al. | |
| 2003/0196492 A1 | 10/2003 | Remboski et al. | 73/593 |
| 2004/0032853 A1 | 2/2004 | D'Amico et al. | |
| 2004/0132444 A1 | 7/2004 | Herrmann | |
| 2004/0158333 A1 | 8/2004 | Ha et al. | |
| 2004/0211228 A1 | 10/2004 | Nishio et al. | |
| 2004/0249903 A1 | 12/2004 | Ha et al. | |
| 2004/0261468 A1 | 12/2004 | Lueckenbach | |
| 2005/0015890 A1 | 1/2005 | Kim et al. | |
| 2005/0029976 A1 | 2/2005 | Terry et al. | |
| 2005/0086979 A1 | 4/2005 | Son et al. | |
| 2005/0129200 A1 | 6/2005 | Forrest et al. | 379/93.37 |
| 2005/0134472 A1 | 6/2005 | Jang et al. | |
| 2005/0162909 A1* | 7/2005 | Wooldridge | 365/185.3 |
| 2006/0048405 A1 | 3/2006 | Baek et al. | |
| 2006/0066758 A1 | 3/2006 | Higashihara | |
| 2006/0089818 A1 | 4/2006 | Norell et al. | |
| 2006/0136544 A1 | 6/2006 | Atsmon et al. | |
| 2006/0168740 A1 | 8/2006 | Ha et al. | |
| 2006/0259199 A1 | 11/2006 | Gjerde et al. | |
| 2007/0113595 A1 | 5/2007 | Harwood et al. | |
| 2007/0137265 A1 | 6/2007 | Shikamori et al. | |
| 2007/0175883 A1 | 8/2007 | Miu et al. | |
| 2007/0189323 A1 | 8/2007 | Swoboda et al. | |
| 2007/0219756 A1 | 9/2007 | Frankel et al. | |
| 2007/0272286 A1 | 11/2007 | Curtius et al. | |
| 2008/0036619 A1 | 2/2008 | Rhodes et al. | |
| 2008/0072383 A1 | 3/2008 | Bextermoller et al. | |
| 2008/0122648 A1 | 5/2008 | Ebrom et al. | |
| 2009/0067102 A1 | 3/2009 | Cline et al. | |
| 2009/0160637 A1 | 6/2009 | Maeng | |
| 2009/0169434 A1 | 7/2009 | Ogusu | |
| 2009/0282308 A1* | 11/2009 | Gutsche et al. | 714/746 |
| 2009/0323914 A1 | 12/2009 | Lee et al. | |
| 2010/0037401 A1 | 2/2010 | Bae et al. | |
| 2010/0116060 A1 | 5/2010 | Murayama | 73/593 |
| 2011/0022358 A1 | 1/2011 | Han et al. | |
| 2011/0060553 A1 | 3/2011 | Han et al. | |
| 2011/0200189 A1 | 8/2011 | True et al. | |

FOREIGN PATENT DOCUMENTS

| | | |
|---|---|---|
| EP | 0 038 687 | 10/1981 |
| EP | 0 510 519 A1 | 10/1992 |
| EP | 0 617 557 A2 | 9/1994 |
| EP | 0 691 060 B1 | 1/1996 |
| EP | 0 742 308 | 11/1996 |
| EP | 0 846 991 | 6/1998 |
| EP | 0 851 054 | 7/1998 |
| JP | 4-358497 A | 12/1992 |
| JP | 11-127254 | 11/1999 |
| JP | 2001-345949 | 12/2001 |
| JP | 2001-353395 A | 12/2001 |
| JP | 2002-000988 A | 1/2002 |
| JP | 2002-011274 A | 1/2002 |
| JP | 2002-045590 A | 2/2002 |
| JP | 2002-85887 | 3/2002 |
| JP | 2002-162149 | 6/2002 |
| JP | 2002-279091 | 9/2002 |
| JP | 2007-267956 A | 10/2007 |
| JP | 2008-003562 A | 1/2008 |
| KR | 10-1991-0020404 A | 12/1991 |
| KR | 10-1996-003308 A | 1/1996 |
| KR | 10-1997-0019443 A | 4/1997 |
| KR | 10-0143209 | 8/1998 |
| KR | 20-1999-0040564 U | 12/1999 |
| KR | 20-0162050 | 12/1999 |
| KR | 10-2000-0018678 A | 4/2000 |
| KR | 10-2001-0063913 A | 5/2001 |
| KR | 10-2001-0055394 A | 7/2001 |
| KR | 10-2002-0020831 A | 3/2002 |
| KR | 10-2002-0030426 A | 4/2002 |
| KR | 10-2002-039959 | 5/2002 |
| KR | 10-2004-0050767 | 6/2004 |
| KR | 10-2004-0095017 | 11/2004 |
| KR | 10-2005-0062747 | 6/2005 |
| KR | 10-2005-0097282 A | 10/2005 |
| KR | 10-2006-0103014 | 9/2006 |
| KR | 10-0641974 | 11/2006 |
| KR | 10-2007-0013090 | 1/2007 |
| KR | 10-2008-0068447 | 7/2008 |
| KR | 10-0887575 | 3/2009 |
| KR | 10-2010-0112950 | 10/2010 |
| KR | 10-2011-0010378 | 2/2011 |
| WO | WO 01/11575 | 2/2001 |
| WO | WO 2005/106096 | 11/2005 |
| WO | WO 2008/010670 | 1/2008 |

OTHER PUBLICATIONS

International Search Report dated Dec. 21, 2009 (Application No. PCT/KR2009/002199).
International Search Report dated Jan. 4, 2010 (Application No. PCT/KR2009/002211).
International Search Report dated Aug. 23, 2010 (Application No. PCT/KR2010/000319).
International Search Report dated Dec. 1, 2010 (Application No. PCT/KR2010/002211).
International Search Report dated Dec. 1, 2010 (Application No. PCT/ICR2010/002222).
Korean Office Action dated Aug. 13, 2012.
Japanese Office Action dated Sep. 11, 2012.
Notice of Allowance issued in U.S. Appl. No. 12/757,205 dated Sep. 14, 2012.
U.S. Office Action issued in U.S. Appl. No. 12/847,303 dated Sep. 14, 2012.
U.S. Office Action issued in U.S. Appl. No. 12/757,232 dated Sep. 18, 2012.
Russian Office Action issued in Application No. 2010144513/08 dated Jun. 27, 2012.
U.S. Office Action issued in U.S. Appl. No. 12/432,132 dated Aug. 15, 2012.
U.S. Office Action issued in U.S. Appl. No. 12/551,827 dated Aug. 16, 2012.
Notice of Allowance issued in U.S. Appl. No. 12/846,040 dated Aug. 17, 2012.
International Search Report dated Apr. 25, 2011 issued in Application No. PCT/KR 2010/004407.
United States Office Action dated Dec. 27, 2011 issued in U.S. Appl. No. 12/432,184.
United States Office Action dated Feb. 10, 2012 issued in U.S. Appl. No. 12/568,022.

United States Office Action dated Feb. 14, 2012 issued in U.S. Appl. No. 12/431,910.
United States Office Action dated Mar. 1, 2012 issued in U.S. Appl. No. 12/846,040.
Russian Office Action dated Feb. 7, 2012. (with translation).
U.S. Office Action issued in U.S. Appl. No. 12/431,903 dated Mar. 8, 2012.
U.S. Office Action issued in U.S. Appl. No. 12/431,893 dated Mar. 19, 2012.
U.S. Office Action issued in U.S. Appl. No. 12/432,132 dated Mar. 20, 2012.
U.S. Office Action issued in U.S. Appl. No. 12/757,205 dated Apr. 2, 2012.
PCT International Search Report dated May 26, 2011 issued in Application No. PCT/KR2010/005108.
U.S. Appl. No. 12/551,827, filed Sep. 1, 2009, Shirley Lu.
U.S. Appl. No. 12/757,232, filed Apr. 9, 2010.
U.S. Appl. No. 12/603,810, filed Oct. 22, 2009, Jennifer Mehmood.
U.S. Appl. No. 13/382,334, filed Jan. 5, 2012.
U.S. Appl. No. 12/842,649, filed Jul. 23, 2010, Andrew M. Schechter.
U.S. Appl. No. 12/842,679, filed Jul. 23, 2010, Benjamin C. Lee.
U.S. Appl. No. 12/846,013, filed Jul. 29, 2010, Benjamin C. Lee.
U.S. Appl. No. 12/847,272, filed Jul. 30, 2010, Andrew M. Schechter.
U.S. Appl. No. 12/847,303, filed Jul. 30, 2010, Benjamin C. Lee.
U.S. Appl. No. 12/847,406, filed Jul. 30, 2010, Andrew M. Schechter.
U.S. Appl. No. 12/847,284, filed Jul. 30, 2010, Andrew M. Schechter.
U.S. Appl. No. 12/847,306, filed Jul. 30, 2010, Andrew M. Schechter.
U.S. Office Action issued in U.S. Appl. No. 12/432,111 dated May 2, 2012.
European Search Report dated May 8, 2012.
Milica Stojanovic; "Recent Advances in High-Speed underwater Acoustic Communications"; IEEE Journal of Oceanice Engineering, IEEE Service Center; Piscataway, NJ; vol. 21, No. 2; Apr. 1, 1996; pp. 125-136 (XP011042321).
U.S. Office Action issued in U.S. Appl. No. 12/757,246 dated May 18, 2012.
U.S. Office Action issued in U.S. Appl. No. 12/757,339 dated May 22, 2012.
U.S. Notice of Allowance issued in U.S. Appl. No. 12/568,022 dated Jun. 11, 2012.
U.S. Office Action issued in U.S. Appl. No. 12/757,213 dated Jun. 25, 2012.
U.S. Office Action issued in U.S. Appl. No. 12/603,810 dated Jul. 5, 2012.
U.S. Office Action issued in U.S. Appl. No. 12/431,910 dated Jul. 23, 2012.
International Search Report issued in Application No. PCT/KR2011/000311 dated Jul. 28, 2011.
U.S. Office Action issued in U.S. Appl. No. 12/431,893 dated Jul. 31, 2012.
Notice of Allowance issued in U.S. Appl. No. 12/842,679 dated Aug. 1, 2012.
U.S. Office Action issued in U.S. Appl. No. 12/431,903 dated Aug. 2, 2012.
U.S. Office Action issued in U.S. Appl. No. 12/432,184 dated Aug. 7, 2012.
Creber, R. B. et al.; "Performance of Undersea Acoustic Networking Using RTS/CTS Handshaking and ARQ Retransmission"; OCEANS, 2001 MTS/IEEE Conference and Exhibition; Nov. 5-8, 2001; Piscataway, NJ; IEEE, vol. 4; Nov. 5, 2001; pp. 2083-2086 (XP010566758).
European Search Report dated Oct. 14, 2011 issued in Application No. 09 73 8950.
European Search Report dated Dec. 17, 2012.
European Search Report dated Jan. 2, 2013.
Ethem M Sözer; "Simulation and Rapid Prototyping Environment for Underwater Acoustic Communications: Reconfigurable Modem"; OCEANS-Europe 2005; MIT Sea Grant College Program; Cambridge, MA, 02139; IEEE; pp. 80-85 (XP10838461A).
U.S. Office Action issued in U.S. Appl. No. 12/757,339 dated Jan. 31, 2013.
European Search Report dated Jan. 31, 2013. (10761908.2).
European Search Report dated Jan. 31, 2013. (10797292.9).
Japanese Office Action dated Feb. 12, 2013. (with translation).
U.S. Office Action issued in U.S. Appl. No. 12/603,810 dated Feb. 13, 2013.
U.S. Office Action issued in U.S. Appl. No. 12/551,827 dated Mar. 11, 2013.
U.S. Office Action issued in U.S. Appl. No. 12/842,649 dated Mar. 22, 2013.
U.S. Appl. No. 12/431,893, filed Apr. 29, 2009, Leshui Zhang.
U.S. Appl. No. 12/431,903, filed Apr. 29, 2009, Leshui Zhang.
U.S. Appl. No. 12/431,910, filed Apr. 29, 2009, Leshui Zhang.
U.S. Appl. No. 12/432,111, filed Apr. 29, 2009, Leshui Zhang.
U.S. Appl. No. 12/432,132, filed Apr. 29, 2009, Leshui Zhang.
U.S. Appl. No. 12/551,827, filed Sep. 1, 2009, Leshui Zhang.
U.S. Appl. No. 12/757,339, filed Apr. 9, 2010, Vishak Ganesh.
U.S. Appl. No. 12/568,022, filed Sep. 28, 2009, Phung Nguyen.
U.S. Appl. No. 12/757,205, filed Apr. 9, 2010, Alexander Satanovsky.
U.S. Appl. No. 12/757,213, filed Apr. 9, 2010, Philip A. Guyton.
U.S. Appl. No. 12/757,232, filed Apr. 9, 2010, Mohamed Charioui.
U.S. Appl. No. 12/757,246, filed Apr. 9, 2010, Vishak Ganesh.
U.S. Appl. No. 12/603,810, filed Oct. 22, 2009, Renee Dorsey.
U.S. Appl. No. 12/432,184, filed Apr. 29, 2009, Minh Chau Nguyen.
U.S. Appl. No. 13/382,334, filed Jan. 5, 2012, Scott T. Baderman.
U.S. Appl. No. 12/842,649, filed Jul. 23, 2010, Xiuqin Sun.
U.S. Appl. No. 12/842,679, filed Jul. 23, 2010, Tai T. Nguyen.
U.S. Appl. No. 12/846,013, filed Jul. 29, 2010, Shirley Lu.
U.S. Appl. No. 12/846,040, filed Jul. 29, 2010, Mark A. Fleischer.
U.S. Appl. No. 12/847,272, filed Jul. 30, 2010, Manuel L. Barbee.
U.S. Appl. No. 12/847,303, filed Jul. 30, 2010, Kerri L. Mcnally.
U.S. Appl. No. 12/847,406, filed Jul. 30, 2010, Manuel L. Barbee.
U.S. Appl. No. 12/847,284, filed Jul. 30, 2010, Manuel L. Barbee.
U.S. Appl. No. 12/847,306, filed Jul. 30, 2010, Manuel L. Barbee.
U.S. Appl. No. 13/522,066, filed Jul. 13, 2012.
U.S. Appl. No. 13/562,704, filed Jul. 31, 2012.
U.S. Appl. No. 13/588,164, filed Aug. 17, 2012.
U.S. Office Action issued in U.S. Appl. No. 12/432,111 dated Nov. 15, 2012.
Chinese Office Action dated Nov. 16, 2012.
U.S. Office Action issued in U.S. Appl. No. 12/431,910 dated Dec. 5, 2012.
U.S. Office Action issued in U.S. Appl. No. 12/757,213 dated Dec. 13, 2012.
U.S. Office Action issued in U.S. Appl. No. 12/432,132 dated Dec. 19, 2012.
U.S. Office Action issued in U.S. Appl. No. 12/846,013 dated Dec. 28, 2012.
U.S. Notice of Allowance issued in U.S. Appl. No. 12/847,303 dated Jan. 11, 2013.
U.S. Office Action issued in U.S. Appl. No. 12/431,903 dated Jan. 2, 2013.
U.S. Office Action issued in U.S. Appl. No. 12/757,246 dated Jan. 17, 2013.
U.S. Office Action issued in U.S. Appl. No. 12/431,893 dated Jan. 29, 2013.
Chinese Office Action dated Jun. 27, 2013.
U.S. Office Action issued in U.S. Appl. No. 12/431,893 dated Jul. 30, 2013.
U.S. Office Action issued in U.S. Appl. No. 12/757,232 dated Apr. 18, 2013.
U.S. Office Action issued in U.S. Appl. No. 12/846,013 dated May 7, 2013.
U.S. Notice of Allowance issued in U.S. Appl. No. 12/603,810 dated Jun. 12, 2013.
U.S. Office Action issued in U.S. Appl. No. 12/432,111 dated Jun. 13, 2013.
U.S. Office Action issued in U.S. Appl. No. 12/847,272 dated Jun. 27, 2013.
U.S. Office Action issued in U.S. Appl. No. 12/757,213 dated Jun. 28, 2013.
U.S. Office Action issued in U.S. Appl. No. 12/847,284 dated Jun. 28, 2013.
U.S. Office Action issued in U.S. Appl. No. 12/847,406 dated Jul. 9, 2013.
U.S. Office Action issued in U.S. Appl. No. 12/847,306 dated Jul. 9, 2013.

* cited by examiner

HOME APPLIANCE AND METHOD FOR OPERATING THE SAME

CROSS-REFERENCE TO RELATED APPLICATION

This application claims the priority benefit of Korean Patent Application No. 10-2009-0072104 and 10-2009-0072107, filed on Aug. 5, 2009 in the Korean Intellectual Property Office, the disclosure of which is incorporated herein by reference.

BACKGROUND OF THE INVENTION

1. Field of the Invention

The present invention relates to a diagnostic system and method for a home appliance, and more particularly to a home appliance diagnostic system and method for performing state inspection and fault diagnosis of a home appliance based on product information of the home appliance, which is output as a sound signal, to facilitate after-sale service for the home appliance.

2. Description of the Related Art

In operation, a home appliance stores values set for execution of the operation, information generated during the operation, fault information, etc. Particularly, in the event of a fault, the home appliance outputs a predetermined alarm, thereby enabling the user to recognize the state of the home appliance. The home appliance may output detailed fault information through its output device, for example, a display device or lamp, as well as simply notifying the user of completion of an operation or occurrence of a fault.

On the other hand, in the event of a fault in the home appliance, the user may utilize an after-sale service of calling a service center to ask advice on the state of the home appliance or request a service technician for the home appliance.

In this case, the home appliance generally outputs fault information simply or as a code value that cannot be understood by the user. For this reason, the user may have difficulty in coping with the fault in the home appliance and in accurately communicating the state of the home appliance to the service center even though contacting the service center. Consequently, when a service technician visits the user's home, a lot of time and cost may be taken for the service technician to repair the home appliance due to lack of accurate prior knowledge as to the state of the home appliance. For example, provided that a part required for repair of the home appliance is not prepared in advance, the service technician will have the inconvenience of re-visiting the user's home, resulting in an increase in repair time.

In order to solve the above problem, the home appliance may be connected to a server of the service center via a communication unit. However, in this case, it is necessary to construct a communication network.

With technological development, a fault may be remotely diagnosed over a telephone network.

European Patent No. 0510519 discloses a technique for transmitting fault information of a home appliance to a service center via a modem connected to the home appliance over a telephone network. However, this technique requires continuous connection of the modem to the home appliance. Particularly, in the case where the home appliance is a laundry treatment machine that is usually installed outdoors, a spatial restriction may be imposed on connecting the laundry treatment machine to the telephone network.

U.S. Pat. No. 5,987,105 discloses a technique for converting fault information of a home appliance into a sound signal of an audible frequency band and transmitting the sound signal to a service center over a telephone using a telephone network. Signal interference may occur depending on an ambient environment in the course of converting the fault information of the home appliance into the sound signal of the audible frequency band and then transmitting the sound signal to a receiver of the telephone. In addition, data may be lost according to characteristics of the telephone network during the transmission of the sound signal over the telephone network.

To perform fault diagnosis on the home appliance as described above, it is necessary not only to output the sound signal but also to store data used to generate the sound signal. Especially, to perform accurate diagnosis on the state of the home appliance, it is necessary not only to generate various data but also to store data in an accumulated manner rather in a temporary manner.

However, when the home appliance suddenly stops operation due to a power a power blackout or power abnormality or due to malfunction of the home appliance, the home appliance may fail to store data, such that it is not possible to diagnose the home appliance.

Since the home appliance with a limited storage capacity cannot store data of the operation of the home appliance in an accumulated manner, there is a need to more efficiently store and maintain the data.

SUMMARY OF THE INVENTION

Therefore, the present invention has been made in view of the above problems, and it is an object of the present invention to efficiently store and maintain data of product information of a home appliance when a sound signal including product information of a home appliance is output from the home appliance and fault diagnosis of the home appliance is performed using the output sound signal including the product information.

It is another object of the present invention to provide a home appliance and a method for operating the same, wherein data required for fault diagnosis of the home appliance is stored while minimizing unnecessary data storage, thereby increasing utilization efficiency of limited resources of the home appliance and enabling more accurate diagnosis of the home appliance.

It is another object of the present invention to provide a home appliance and a method for operating the same, wherein, even when the home appliance suddenly stops operation in an emergency situation, product information of the home appliance is stored according to each situation, thereby enabling accurate diagnosis of the home appliance.

In accordance with an aspect of the present invention, the above and other objects can be accomplished by the provision of a method for operating a home appliance, the method including comparing, when an operation setting is input and an activation key is input, a post-error operation count with a reference count and maintaining stored diagnostic data included in product information when the post-error operation count is equal to or less than the reference count, starting operation of the home appliance according to the operation setting and temporarily storing data generated during the operation, discarding the temporarily stored data and maintaining the diagnostic data when the operation is completed according to the operation setting, and storing, when an error has occurred before the operation is completed, the temporarily stored data as the diagnostic data to update the diagnostic data using data regarding the error.

In accordance with another aspect of the present invention, there is provided a method for operating a home appliance, the method including receiving a stop command during operation of the home appliance due to at least one of key input, power cut, power blackout, and forcible operation termination, storing information including at least one of temporary data, state information, an error code, option information, and power information as diagnostic data in response to the stop command, turning power off, and generating, when a command to perform fault diagnosis is input, product information for fault diagnosis using the diagnostic data and modulating the product information to output the product information as a sound signal.

In accordance with another aspect of the present invention, there is provided a home appliance including a selector for inputting a command to perform fault diagnosis, a memory for storing at least one diagnostic data included in product information of the home appliance for the fault diagnosis, a controller for storing data generated during operation of the home appliance as the diagnostic data in the memory, creating the product information using the diagnostic data when a command to perform fault diagnosis is input through the selector, and encoding the product information to generate a digital signal including a plurality of frames, a modulator for generating a frequency signal corresponding to the digital signal, and a sound output device driven by the modulator to output a sound signal corresponding to the frequency signal, wherein, when an error occurrence history is present, the controller temporarily stores the data generated during the operation and discards the temporarily stored data and maintains the stored diagnostic data when the operation is terminated normally, and stores the temporarily stored data as the diagnostic data when an error has occurred during the operation.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PREFERRED EMBODIMENTS

Reference will now be made in detail to the preferred embodiments of the present invention, examples of which are illustrated in the accompanying drawings. Wherever possible, the same reference numbers will be used throughout the drawings to refer to the same or like parts.

Figure 1:
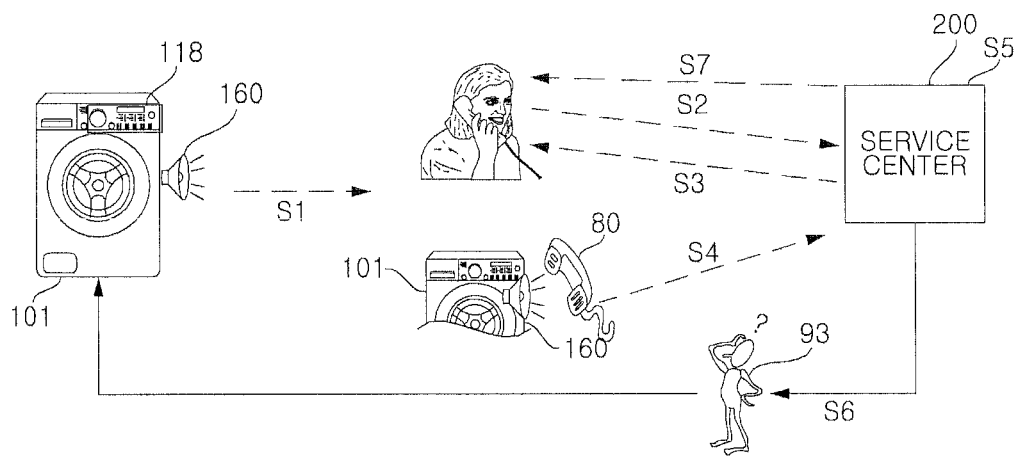
FIG. 1 is a schematic view showing the configuration of a home appliance diagnostic system according to an embodiment of the present invention.

FIG. 1 is a schematic view showing the configuration of a home appliance diagnostic system according to an embodiment of the present invention.

Referring to FIG. 1, a home appliance of the present invention is configured in such a manner that, when a home appliance 101 in each home outputs information about the operation thereof in the form of a sound signal, the sound signal, which includes product information, is input to a portable terminal such as a mobile phone or a telephone and is then transmitted to a service center 200 over a telephone network so that a diagnostic server in the service center 200 may diagnose the state of the home appliance 101 to determine whether the home appliance 101 is out of order.

The home appliance diagnostic system includes the home appliance 101 and the service center 200 for monitoring the state of the home appliance 101 and diagnosing the fault of the home appliance 101. The service center 200 includes the diagnostic server having home appliance information and a diagnosis program.

The home appliance 101 includes a display device 118 for displaying predetermined data. The display device is a light emitter such as a light emitting diode (LED), a liquid crystal display (LCD) or an organic electro-luminescent (EL) display, and visually displays state information or fault information of the home appliance 101. The home appliance 101 further includes a sound output device 160 for outputting a sound signal. The sound output device 160 reproduces and outputs information about the operation, state or fault of the home appliance 101 as a predetermined sound signal.

When the home appliance 101 malfunctions or operates abnormally, it notifies the user of occurrence of a fault by outputting an error code through the display device 118 or outputting an alarm sound through the sound output device 160 (S1).

Here, the home appliance 101 stores product information including operation information, fault information, and user information.

The user confirms information of the home appliance 101 displayed on the display device of the home appliance 101 and then controls the operation of the home appliance 101 or requests repair of the home appliance 101 from the service center 200. At this time, the user may contact the service center 200 to notify the service center 200 that a fault has occurred in the home appliance 101 and ask advice on the fault (S2).

In the case where the user connects to the service center 200 and manipulates a selector (not shown) of an input device (not shown) in the home appliance 101 in response to a request from the service center 200 (S3), the home appliance 101 converts the product information into a predetermined sound signal and outputs the sound signal through the sound output device 160. The sound signal including the product information, output in this manner, is transmitted to the service center 200 over a communication network (S4).

At this time, the user may notify the service center 200 of model information and fault symptoms of the home appliance 101 and place a portable terminal 80 such as a mobile phone or a telephone close to a sounding portion of the home appliance 101, that is, the sound output device 160 during the call with the service center 200 to transmit the sound signal including the product information of the home appliance 101 to the service center 200. In this manner, the user may transmit the sound signal including the product information of the home appliance 101 to the service center 200 using portable terminal 80 such as a telephone or a mobile phone to request an after-sale service (A/S) for the home appliance 101.

The service center 200 receives the sound signal output from the home appliance 101 over a communication network connected thereto, for example, a telephone network, and checks the product state of the home appliance 101 based on the received sound signal to diagnose whether the home appliance 101 is out of order (S5).

Based on a result of the diagnosis, the service center 200 dispatches a service technician 93 to the user's home to provide a service suitable for the product state and fault diagnosis of the home appliance 101 (S6). In step S6, the diagnosis result may be transmitted to a terminal of the service technician 93 so that he/she may fix the home appliance 101.

In addition, the service center 200 may connect with the user through the communication network to transmit the diagnosis result to the user in the form of a voice through a customer service agent or in the form of predetermined data (S7).

Therefore, when the user connects to the service center 200 through a communication network, for example, a telephone network, the diagnostic system can accurately determine the state of the home appliance 101 based on a sound signal, thereby providing rapid service and also allowing the user to easily check the state of the home appliance.

Although the home appliance 101 of the present invention will hereinafter be described for illustrative purposes as being a laundry treatment machine, the present invention is not limited thereto. Rather, it is to be clearly understood that the present invention is applicable to all home appliances including TVs, air conditioners, refrigerators, electric rice cookers, and microwave ovens. In the following description, a telephone network or a mobile communication network is used as an example of the communication network and a telephone or a mobile phone is used as an example of the portable terminal 80.

The home appliance 101 is constructed as described below to output product information as a sound signal.

Figure 2:
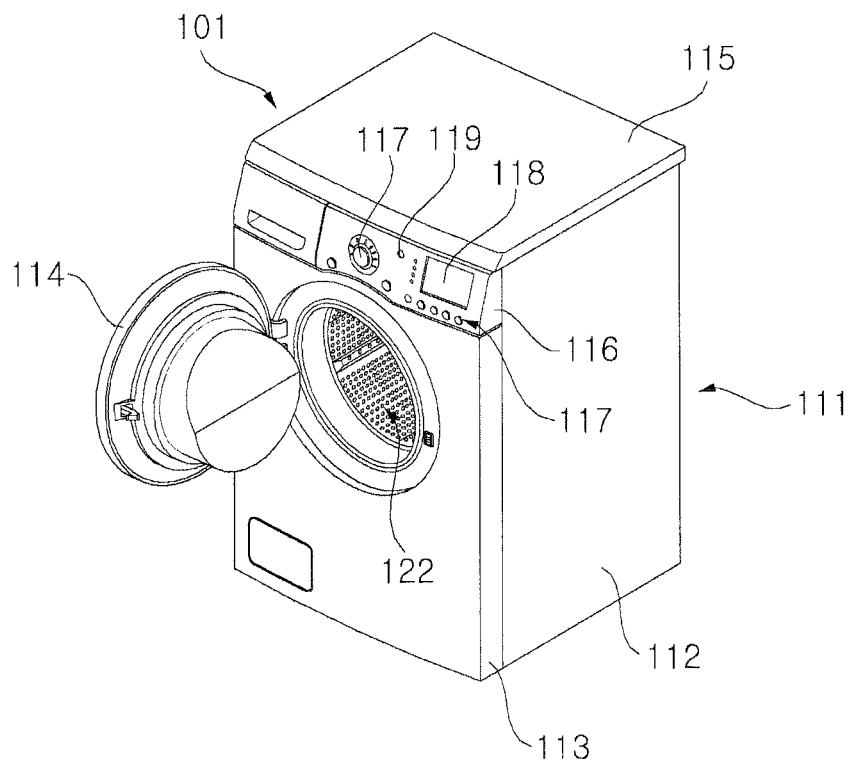
FIG. 2 is a perspective view showing the configuration of a home appliance according to an embodiment of the present invention.

FIG. 2 is a perspective view showing the configuration of a home appliance according to an embodiment of the present invention.

A description will hereinafter be given of a laundry treatment machine as an example of the home appliance.

Referring to FIG. 2, the laundry treatment machine 101, which is the home appliance of the present invention, includes a cabinet 111, a tub 122 disposed inside the cabinet 111 for washing laundry, a motor (not shown) for driving the tub 122, a wash water supply (not shown) for supplying wash water to the tub 122, and a drainage device (not shown) for draining the wash water externally after the laundry is washed.

The cabinet 111 includes a cabinet body 112, a cabinet cover 113 coupled to a front side of the cabinet body 112, a control panel 116 disposed over the cabinet cover 113 for controlling the operation of the laundry treatment machine 101, and a top plate 115 disposed over the control panel 116 and coupled to the cabinet body 112. The cabinet cover 113 includes a hole (not shown) for putting in or taking out the laundry therethrough, and a door 114 for pivotally moving to open/close the hole.

The control panel 116 is provided with an input device including a manipulator 117 having a plurality of manipulating keys for manipulating the laundry treatment machine 101, a sound output device 160 for outputting a sound signal indicative of the operating state of the laundry treatment machine 101, and a display device 118 for displaying the operating state of the laundry treatment machine 101 in the form of text, a numeral, a special symbol, an image, or the like. In the input device, the manipulator 117 may be configured with an input unit for applying a certain signal by push, contact, pressure, rotation, or the like, such as a key, a button, a switch, a rotary switch, or a touch input unit.

When the user has manipulated a selector in the control panel 116, the laundry treatment machine 101 receives a smart diagnosis mode command and a signal output command, converts product information into a digital signal in a predetermined format, and provides the digital signal to a modulator (not shown). As the modulator operates according to the digital signal, a predetermined sound signal is output through the sound output device 160.

The sound output device 160 is provided at a rear side of the control panel 116 to output a sound signal from the inside of the control panel 116. The sound output device 160 is spaced apart from the manipulator 117, a selector 130 or a sound output hole 119 by a predetermined distance so that it can be protected from water or foreign substances incoming from the outside.

The sound signal output from the sound output device 160 is externally emitted through cracks of portions of the control panel 116, in which keys of the manipulator 117 or selector 130 are formed, along a sound path or sound guide portion formed at the rear side of the control panel 116. Alternatively, in the case where the separate sound output hole 119 is provided, the sound signal output from the sound output device 160 may be externally emitted through the sound output hole 119.

Here, it is preferable that the keys of the manipulator 117 or selector 130 be constructed so as to enlarge the gap between the control panel 116 and each of the keys or to permit an internal sound to be emitted externally when pressed.

The sound output device 160 may include at least one sound output device.

For example, in the case where the sound output device 160 includes two sound output devices, one of the sound output devices may output a sound signal of a combination of predetermined frequencies including product information of the home appliance and the other may output an effect sound or alarm sound of the home appliance and an indication sound indicative of the start or end of the output of the sound signal including the product information.

The sound signal output from the sound output device 160 is transmitted to the service center 200 through the portable terminal 80, connected to a communication network. Here, the communication network may be, for example, a telephone network or mobile network, and the portable terminal 80 may be, for example, a telephone or mobile phone.

The service center 200, which includes the diagnostic server, receives the sound signal output from the laundry treatment machine 101 and analyzes the received sound signal, so as to acquire operation information and fault information of the laundry treatment machine 101. As a result, the service center 200 transmits a countermeasure against a faulty operation of the laundry treatment machine 101 to the user or dispatches a service technician to the user's home.

Figure 3:
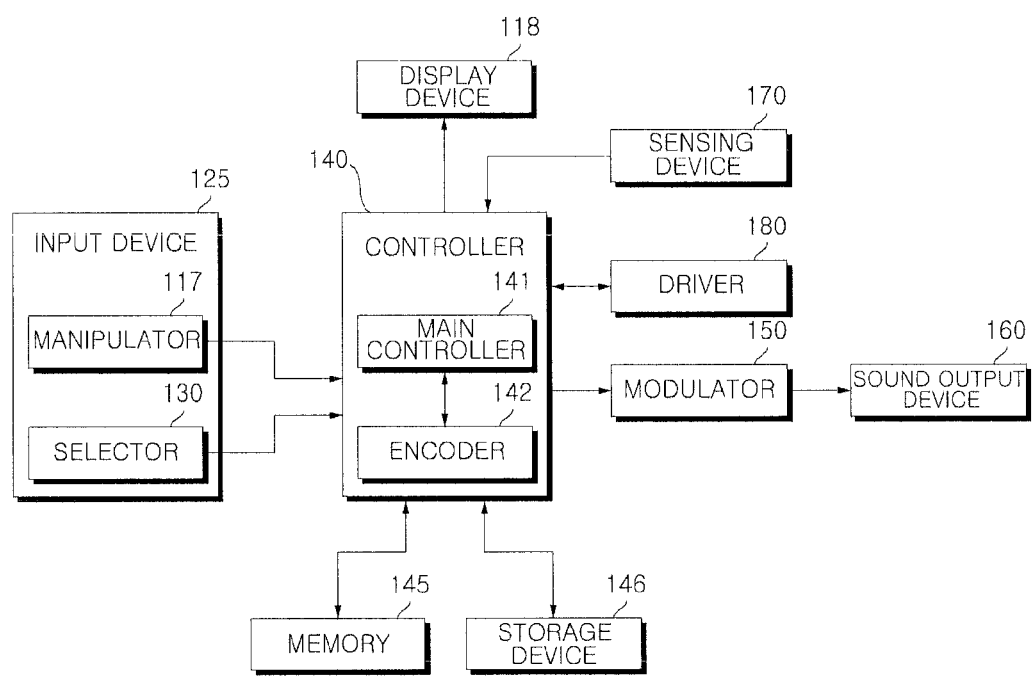
FIG. 3 is a block diagram showing a configuration for control of a home appliance in the home appliance diagnostic system of FIG. 1.

FIG. 3 is a block diagram showing a configuration for control of a home appliance in the home appliance diagnostic system of FIG. 1.

The home appliance 101 configured as stated above has a control configuration for performing a washing mode, a rinsing mode, a spin-drying mode, etc. for laundry within the home appliance 101, processing data generated during the operation of the home appliance 101, and, when a smart diagnosis mode is set based on an input of a selector, generating product information including data of the home appliance 101 in the form of a digital signal of a predetermined format and outputting a predetermined sound signal based on the digital signal.

Referring to FIG. 3, the home appliance 101 includes an input device 125, a sensing device 170, a memory 145, a storage device 146, a driver 180, a modulator 150, the sound output device 160, and a controller 140 for controlling the entire operation of the home appliance 101.

The input device 125 is provided with at least one input unit for inputting a predetermined signal or data to the home appliance 101 according to a user manipulation. The input device 125 includes the manipulator 117 and the selector 130.

The selector 130 has at least one input unit. Upon selection of the smart diagnosis mode, the selector 130 applies a signal output command to the controller 140 so that product information is output in the form of a predetermined sound signal through the sound output device 160.

The selector 130 may be provided with input units separate from those of the manipulator 117. Alternatively, the manipulator 117 may include two or more input units that may operate or be recognized as the selector when manipulated simultaneously, or a specific input unit that may operate or be recognized as the selector when manipulated consecutively or for a predetermined time or more.

As the smart diagnosis mode is entered, the selector 130 turns on/off the sound output device 160. That is, when the signal output command is input by the selector 130, a digital signal including product information is output in the form of a predetermined sound signal in response to a control command from the controller 140. At this time, the sound output device 160 operates to output the sound signal.

The manipulator 117 receives data such as an operation course or operation setting according to the operation of the home appliance 101 and applies the received data to the controller 140. The manipulator 117 also receives settings related to sound signal output. That is, the manipulator 117 receives values for setting a sound signal output method, the level of a sound signal to be output, etc.

The input device 125 including the selector 130 and the manipulator 117 may be configured to include buttons, a dome switch, a touch pad (static pressure/capacitance), a jog wheel, a jog switch, a finger mouse, a rotary switch, a jog dial, or the like. Any device may serve as the input device 125 so long as it generates predetermined input data by a manipulation such as push, rotation, pressure or contact.

The sensing device 170 includes at least one sensor for sensing a temperature, a pressure, a voltage, current, the level of water, the number of rotations, or the like, and applies sensed or measured data to the controller 140. For example, when water is supplied or drained to or from the laundry treatment machine, the sensing device 170 may measure the level of the water, the temperature of the supplied water, and the rotation speed of the tub or drum. The sensing device 170 includes at least one temperature sensing device (not shown).

The driver 180 controls driving of the home appliance 101 in response to a control command from the controller 140 such that the home appliance 101 performs a set operation. Therefore, the laundry treatment device washes laundry by performing a series of modes including a washing mode, a rinsing mode and a spin-drying mode. The driver 180 includes a motor controller (not shown) for applying an operation control signal to the motor.

For example, in the case of the laundry treatment machine, the driver 180 may drive a motor that rotates the tub or drum, and control the operation of the motor to wash soiled laundry through rotation of the tub or drum. Also, the driver 180 may control a valve in response to a control command from the controller 140 to supply or drain water.

The memory 145 stores control data for controlling the operation of the home appliance 101, reference data used during the control operation of the home appliance, and the like.

The memory 145 includes all data storage units including a read only memory (ROM) or electrically erasable programmable ROM (EEPROM) for storing control data for the home appliance. The storage device 146 is a buffer for the controller 140 that temporarily stores data. The storage device 146 may be, for example, a dynamic random access memory (DRAM) or static RAM (SRAM). As needed, the storage device 146 may be incorporated into the controller 140 or memory 145.

While the home appliance 101 performs a desired operation, the memory 145 stores operation information including operating state data generated during the operation and set data input by the manipulator 117 such that the home appliance 101 performs the desired operation, usage information including the number of occurrences of a specific operation in the home appliance 101 and model information of the home appliance 101, and fault information including information about the cause or position of a fault when the home appliance 101 malfunctions.

The controller 140, when a signal for smart diagnosis mode entry is input from the selector 130, fetches product information stored in the memory 145 or storage device 146, generates a digital signal of a predetermined format from the product information and applies the digital signal to the modulator 150. Also, as the selector 130 is manipulated, the controller 140 controls the sound output device 160 to operate it.

The controller 140 includes a main controller 141 for controlling a flow of data being input or output to or from the home appliance 101, generating and applying a control command based on data input from the sensing device 170, or providing sensed data to the driver 180 to control the driver 180 to operate the home appliance 101, and an encoder 142 for converting product information into a digital signal of a predetermined format in response to an input of the selector 130 such that a sound signal based on the digital signal is output.

The main controller 141, when the smart diagnosis mode is entered in response to the input of the selector 130, outputs a start sound indicating the start of the smart diagnosis mode through the sound output device 160 and displays predetermined data indicating the execution of the smart diagnosis mode through the display device 118.

Also, when a digital signal generated by the encoder 142 is applied to the modulator 150 and a sound signal is thus output through the sound output device 160, the main controller 141 controls the sound output device 160 to output a predetermined indication sound before and after the output of the sound signal. The indication sound before the output of the sound signal may be omitted as needed.

On the other hand, in the case where the sound output device 160 includes two or more sound output devices, the main controller 141 may control the sound output devices to output the indication sound and the sound signal including the product information through different ones of the sound output devices, respectively.

Upon entry into the smart diagnosis mode, the main controller 141 disables the manipulator 117 except for a power key and the selector 130 and controls the sensing device 170 and the driver 180 to make the home appliance 101 discontinue all other operations.

Also, when any one manipulating key of the manipulator 117 for setting of the operation of the home appliance 101 is input after power input, the main controller 141 does not start the smart diagnosis mode even though the selector 130 is input. Particularly, in the case where the selector 130 is not provided separately and an input of a combination of two or more of a plurality of manipulating keys of the manipulator 117 is recognized as the input of the selector 130, the main controller 141 starts the smart diagnosis mode only when the selector 130 is input by a specified key combination immediately without any other input after the input of the power key.

That is, the setting of the operation of the home appliance by the manipulator 117 is considered to indicate that the user has no intention of entering the smart diagnosis mode, and the main controller 141 thus does not enter the smart diagnosis mode. Also, it is possible to prevent the smart diagnosis mode from being entered unnecessarily due to a faulty manipulation of the manipulator 117.

The encoder 142 fetches the product information stored in the memory 145, encodes the product information according to a predetermined encoding scheme and adds a preamble and an error check bit to the resulting data signal, so as to generate a digital signal of a predetermined format. The encoder 142 generates a digital signal consisting of a plurality of symbols by encoding the product information.

The encoder 142 encodes the product information using a bit error correction coding scheme to protect against data loss that may occur during transmission of the product information as a sound signal over the communication network. The encoder 142 uses a forward error correction (FEC) scheme as an example of the bit error correction coding scheme. The encoder 142 encodes the product information using convolutional coding. Thus, the diagnostic server of the service center 200 decodes the sound using a Viterbi decoding algorithm as the convolutional coding.

The encoder 142 performs such encoding based on a ½ code rate scheme, in which 2 bits are output for 1 bit input, or based on a ⅔ code rate scheme. In addition, the encoder 142 reduces the number of redundant bits using a puncturing algorithm.

The encoder 142 also performs bit interleaving against burst errors that may occur during data transmission. The encoder 142 performs bit interleaving on data on the basis of a predetermined number of bits, for example, 32 bits. That is, when the data is 60 bytes, the encoder 142 performs bit interleaving on data by permuting the data on a four by four byte basis according to a predetermined rule.

In the course of generating the digital signal, the encoder 142 may divide the digital signal into a plurality of frames by a predetermined size and packetize the frames into a packet. Also, the encoder 142 may set an inter-frame space (IFS) of a predetermined duration between adjacent ones of the frames of the digital signal. Also, during signal conversion, the encoder may set a dead time in a symbol in a period in which a data value is changed, in order to eliminate reverberation that affects the next signal conversion due to the principle of charging and discharging of a capacitor.

Assuming that the length of each of the symbols constituting the digital signal is a symbol time and the fundamental length of a frequency signal constituting the sound signal from the sound output device 160, corresponding to each symbol, is also a symbol time, the encoder 142 may set a dead time within the symbol time with respect to one symbol. In this case, the length of the dead time varies with the length of the symbol time.

The product information includes operation information including operation settings, operating state data, etc., usage information, and fault information about a faulty operation, as stated above. The product information is data consisting of a combination of 0s or 1s, which is a digital signal of a format readable by the controller 140.

The controller 140 generates a digital signal of a predetermined format by classifying data of the product information, incorporating specific data into the classified data and dividing the resulting data by a certain size or combining the resulting data, and applies the generated digital signal to the modulator 150.

Also, the controller 140 may change the number of symbols corresponding to output frequency signals according to the number of frequencies used in the modulator 150.

The modulator 150 applies a drive signal to the sound output device 160 in response to the digital signal from the controller 140 such that the sound output device 160 outputs a sound signal. The sound signal output in this manner includes product information.

The modulator 150 applies the drive signal to the sound output device 160 such that a specified frequency signal corresponding to one of the symbols constituting the digital signal is output for a symbol time.

The modulator 150 performs a control operation such that the sound signal is output through a plurality of frequency bands in accordance with the digital signal while changing the number of symbols for each frequency signal based on the number of used frequencies in accordance with setting of the controller 140. For example, one frequency signal may be output per 1 symbol when two frequencies are used and one frequency signal may be output per 2 symbols when four frequencies are used.

The modulator 150 includes frequency oscillators (not shown) for generating as many oscillation frequencies as the number of available frequencies and controls the sound output device 160 to output frequency signals from frequency oscillators that are specified in accordance with the digital signal.

The modulator 150 converts the digital signal from the controller 140 into the sound signal using one of frequency shift keying, amplitude shift keying, or phase shift keying while controlling the sound output device 160 to output the sound signal in accordance with the digital signal.

Frequency shift keying converts the digital signal into a signal having a frequency corresponding to a data value of the digital signal, amplitude shift keying converts the digital signal by changing the amplitude of the digital signal according to the data value, and phase shift keying converts the digital signal by changing the phase of the digital signal according to the data value.

Binary frequency shift keying (BFSK), which is a type of frequency shift keying, converts the digital signal into a signal of a first frequency when the digital signal has a data value of 0 and into a signal of a second frequency when it has a data value of 1. For instance, BFSK converts data value 0 into a signal of a frequency of 2.6 KHz and converts data value 1 into a signal of a frequency of 2.8 KHz.

Amplitude shift keying may convert the digital signal into a signal of a frequency of 2.6 KHz with an amplitude of 1 when the digital signal has a data value of 0 and an amplitude of 2 when it has a data value of 1.

While the modulator 150 has been described as using frequency shift keying as an example, the modulation scheme used may be changed. Also, the frequency bands used are a mere example and may be changed.

If a dead time is set in the digital signal, the modulator 150 discontinues modulation during an interval in which the dead time is set in the digital signal. The modulator 150 modulates the digital signal using pulse width modulation (PWM) and switches an oscillation frequency for modulation off during the interval, in which the dead time is set, to temporarily discontinue the frequency signal modulation during the dead time. This controls inter-symbol reverberation of the sound signal output from the sound output device 160.

The sound output device 160 is activated or deactivated according to a control command from the controller 140. The sound output device 160 emits a predetermined sound signal including product information by outputting a frequency signal corresponding to the digital signal for a specified time under the control of the modulator 160.

Here, one or more sound output devices 160 may be provided. For example, when two sound output devices are provided, one of the two sound output devices may output a sound signal including product information and the other may output an alarm sound or an effect sound corresponding to state information of the home appliance and may also output an indication sound before a smart diagnosis mode is entered or before the sound signal is output.

The sound output device 160 is deactivated after completely outputting the digital signal as the predetermined sound signal in accordance with the output of the modulator 150. When the selector 130 is manipulated again, the sound output device 160 is reactivated to output the predetermined sound signal carrying product information through the above-described process.

While a sound output unit such as a speaker or a buzzer is applicable as the sound output device 160, a speaker having a wide reproduction frequency range is preferable in order to use a plurality of frequency bands.

When the smart diagnosis mode is entered, the sound output device 160 emits a start sound indicating the start of the smart diagnosis mode according to a control command from the main controller 141 and also outputs respective predetermined indication sounds at the start and end of outputting a sound signal carrying product information.

In response to a control command from the main controller 141, the display device 118 displays, on a screen, information such as information received from the selector 130 and the manipulator 117, operating state information of the home appliance 101, and information associated with completion of the operation of the home appliance 101. When the home appliance 101 operates abnormally, the display device 118 also displays fault information about the abnormality on the screen.

The display device 118 displays information indicating the smart diagnosis mode when the smart diagnosis mode has been started in response to a control command from the main controller 141. When the sound output device 160 outputs a sound signal, the display device 118 displays the progress of the sound output in the form of at least one of text, an image, and a numeral.

The home appliance 101 may include an output unit such as an illuminating or flickering lamp, a vibrator, or the like, which will not be described herein, in addition to the sound output device 160 and the display device 118.

The home appliance 101 constructed as described above outputs the predetermined sound signal to transmit product information of the home appliance 101 to the service center 200 as described below.

Figure 4:
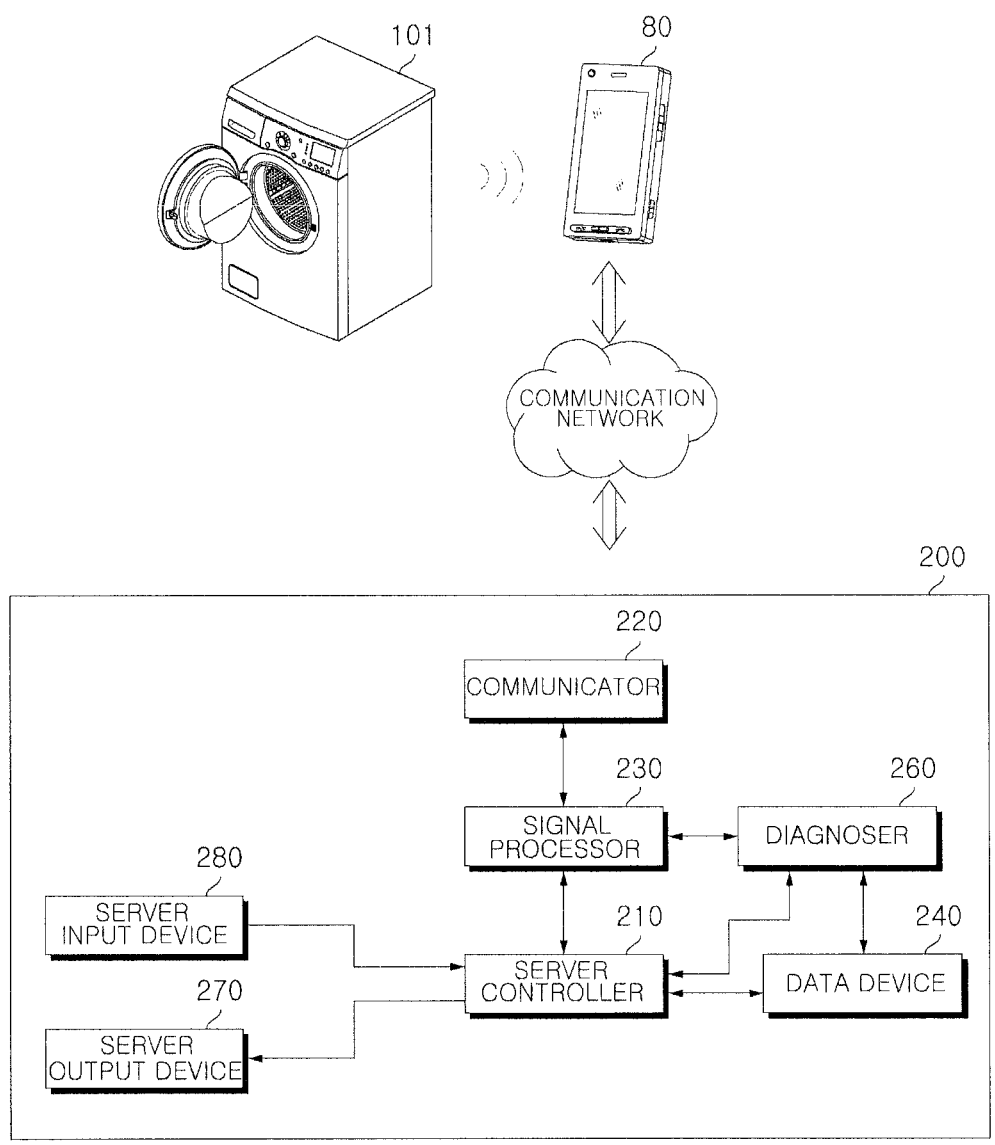
FIG. 4 is a block diagram of a diagnostic server of a service center in the home appliance diagnostic system illustrated in FIG. 1.

FIG. 4 is a block diagram of the diagnostic server of the service center in the home appliance diagnostic system illustrated in FIG. 1.

When the home appliance 101 emits a sound signal, the sound signal is provided to the portable terminal 80 and then transmitted to the service center 200 over the communication network. The service center 200 receives the sound signal and applies it to the diagnostic server, which then performs a fault diagnoses of the home appliance 101 based on the sound signal.

Referring to FIG. 4, the diagnostic server of the service center 200 includes a communicator 220, a signal processor 230, a data device 240, a server input device 280, a server output device 270, a diagnoser 260, and a server controller 210 for providing overall control to the diagnostic server.

The server input device 280 and the server output device 270 provide a predetermined input/output interface, through which a manager of the service center 200, a user, and a service technician may check the progress and result of a diagnosis, and receive or output data.

The server input device 280 includes input units such as buttons, keys, a touchpad or a switch that the user of the service center 200 manipulates. The server input device 280 includes a connection interface for interfacing with an external input device and a portable memory.

When a specific input unit of the server input device 280 is manipulated, the server input device 280 applies a signal to the server controller 210 to allow the diagnostic server to receive a sound signal from the home appliance 101 through the telephone or mobile phone of the user connected to the diagnostic server over the telephone network or mobile network.

The server output device 270 includes a display for displaying operation information and diagnosis results of the diagnostic server.

The communicator 220 is connected to an internal network of the service center 200 and transmits and receives data to and from the network. The communicator 220 is also connected to an external network such as the Internet to communicate with the external network. Especially upon receipt of a recording command or a reception command through the server input device 280, the communicator 220 receives a sound signal from the home appliance over the telephone network and transmits a diagnosis result externally when a diagnosis is completed, according to a control command from the server controller 210.

The communicator 220 transmits the diagnosis result to the terminal of the service technician or to the portable terminal of the user.

The data device 240 stores control data for controlling the operation of the diagnostic server, a sound signal received from the home appliance such as a laundry treatment machine in the form of sound signal data, reference data for sound signal conversion and product information extraction, and fault diagnostic data for diagnosing whether the home appliance is out of order and the cause of a fault.

Also, the data device 240 stores temporary data generated during the process of converting received data or detecting product information and also stores diagnosis result data and a diagnosis result report to be transmitted to the user.

The data device 240 receives, outputs, manages, and updates data under the control of the server controller 210.

The signal processor 230 converts the received sound signal into a readable sound signal, extracts product information from the converted sound signal, and applies the product information to the diagnoser 260.

The signal processor 230 converts and stores the received analog sound signal. The signal conversion is the reverse of signal conversion in the home appliance 101. Preferably, each home appliance and the diagnostic server convert data using the same scheme preset by agreement therebetween. The signal processor 230 converts an analog sound signal in a predetermined frequency band into a digital signal through demodulation using one of frequency shift keying, amplitude shift keying or phase shift keying.

After extracting the digital signal on a frame basis from the demodulated data, the signal processor 230 acquires the product information by decoding the digital signal. The signal processor 230 detects a preamble, acquires the digital signal including the product information based on the preamble, and extracts the product information of the home appliance from the digital signal by decoding the digital signal of a predetermined format using a decoding scheme corresponding to the coding scheme used for the product information in the home appliance.

The signal processor 230 converts and analyzes the digital signal based on structure or format information, frequency characteristics, and decoding information of the digital signal stored in the data device 240.

The product information is applied to the diagnoser 260 and stored in the data device 240.

The diagnoser 260 determines the operating state of the home appliance 101 and whether the home appliance 101 is out of order by analyzing the input product information according to a control command from the server controller 210. The diagnoser 260 has a diagnosis program for analyzing the product information of the home appliance and determining the state of the home appliance based on the product information, and diagnoses the home appliance 101 using the fault diagnostic data stored in the data device 240.

Also, the diagnoser 260 analyses the cause of the fault, derives a solution or a measure to take against the fault, and outputs a diagnosis result in relation to a customer service direction.

The diagnoser 260 classifies data of the product information according to a predetermined criterion and performs the fault diagnosis according to a combination of associated data among the classified data. During the fault diagnosis, the diagnoser 260 determines which item is correctly diagnosable and which item is not correctly diagnosable and performs fault diagnosis on diagnosable items in descending order of fault probability.

The diagnosis result includes a fault ID or location, a probability-based fault cause list, a defective part list, and guidance information indicating whether a service technician is to be dispatched.

The server controller 210 controls data transmission and reception through the communicator 220 and data input and output through the server input device 280 and the server output device 270. In addition, the server controller 210 controls the operations of the signal processor 230 and the diagnoser 260 to diagnose the fault of the home appliance 101. The server controller 210 performs a control operation such that the diagnosis result of the diagnoser 260 is output through the server output device 270 and transmitted through the communicator 220.

The server controller 210 performs a control operation such that the diagnosis result of the diagnoser 260 is output through the server output device 270. Hence, the service center 200 notifies the user of an action to be taken in relation to the malfunction of the home appliance 101 by voice over the telephone network or dispatches a service technician to the user. In the latter case, the server controller 210 transmits the diagnosis result to the terminal of the service technician through the communicator 220.

Also, the server controller 210 may transmit the diagnosis result to the user through the communicator 220.

In the mean time, when an error has occurred during the signal processing or the diagnosis process, the server controller 210 outputs an alarm sound or a message requesting sound signal retransmission of the home appliance 101 through the server output device 270. In this case, the service center 200 requests the user connected thereto through the communication network to re-output a sound signal of the home appliance.

The product information of the home appliance, which is transmitted after being converted into a sound signal for fault diagnosis, includes a plurality of data associated with the operations of the home appliance. The home appliance stores a plurality of diagnostic data required for fault diagnosis. The following describes the product information.

As described above, the home appliance stores product information in the memory 145 and the product information includes a plurality of diagnostic data.

The main controller 141 stores diagnostic data corresponding to the operating state of the home appliance in the memory 145 or stores the diagnostic data in the memory 145 after temporarily storing it in the storage device 146. Here, the main controller 141 changes the time or frequency of storage of the diagnostic data according to the type of the diagnostic data.

The main controller 141 reads the diagnostic data stored in this manner when the smart diagnosis mode is entered, encodes the read diagnostic data into a digital signal in a predetermined format through the encoder 142, converts the digital signal into a sound signal through the modulator 150, and outputs the sound signal through the sound output device 160.

The main controller 141 performs data initialization before starting operation and stores diagnostic data at intervals of a specific period or as needed while the main controller 141 operates according to setting. Here, the main controller 141 maintains initial values of an operation that has not been actually performed although it has been set to be activated.

Depending on the type of the diagnostic data, the main controller 141 stores diagnostic data immediately each time the data value of the diagnostic data has changed, stores diagnostic data when an error has occurred, or stores diagnostic data associated with each operation such as washing, rinsing, or spin-drying upon completion of the operation.

Thus, the memory 145 stores product information including the operation information, the usage information and the fault information under control of the main controller 141. The storage device 146 also stores temporary data about the operation information and fault information generated during the operation of the home appliance. For example, the product information may include the number of uses of the laundry treatment machine, a set course, option setting information, an error code, a value measured by a sensor, data calculated by the controller 140, and operation information of each component.

In the case of the laundry treatment machine, the operation information includes information necessary for the operation of the laundry treatment machine, such as information about the washing mode of the laundry treatment machine, information about the spin-drying mode of the laundry treatment machine and information about the rinsing mode of the laundry treatment machine.

The fault information may include, when the laundry treatment machine performs each operation, various information including fault information generated during each operation, device fault information of the laundry treatment machine, error codes corresponding to fault information, information of the controller 140, values sensed by the sensing device 170, sensed values of the motor, fault information of the wash water supply, and fault information of the drainage device.

The usage information may include various information including the number of uses of the laundry treatment machine by the user, a course set by the user, and option setting information set in the laundry treatment machine. That is, the usage information may include contents input to the laundry treatment machine by the user or information initially set in the laundry treatment machine.

The product information is stored as in the following table.

TABLE 1

| Category | Name | Size (byte) |
| --- | --- | --- |
| Operation info | Status | 1 |
| Customer info | Common | 11 |
| | Wash | 4 |
| | Rinse | 4 |
| | Spin | 6 |
| | Dry | 8 |
| | Error code | 1 |
| | Counts | 8 |
| | Options | 9 |

Referring to Table 1, "Category" indicates the attributes of the product information and "Name" provides the meaning of each category.

"Status" indicates information of a mode which is performed last among all modes of the laundry treatment machine 101. That is, "Status" indicates product information of the laundry treatment machine 101 about the rinsing mode when the laundry treatment machine 101 performs the rinsing mode last among the washing, spin-drying, and rinsing modes at the request of the user. "Status" is 1 byte long.

"Common" is product information having an attribute that should be sampled over all modes of the laundry treatment machine 101. That is, "Common" indicates product information in each mode or at a specific time when the motor, the wash water supply, and the like operate throughout all modes of the laundry treatment machine 101. "Common" is set to be 11 bytes long. Here, data having a "Common" attribute is initialized at a preparatory step before the operation starts and is stored as needed during the operation and is also stored when a failure has occurred or when the operation is terminated. Depending on the type of the "Common" data, the "Common" data may be stored only when a specific error has occurred.

"Wash" indicates product information having an attribute that should be sampled in the washing mode. For example, "Wash" provides product information having an attribute that should be sampled in the washing mode such as the level of wash water or the operation time of the wash water supply when the washing mode is performed. "Wash" is set to be 4 bytes long. Data about "Wash" is stored when the washing mode is being performed or when the washing mode has been completed and is also stored when an error has occurred. Here, when spinning, which is the last operation of the washing mode, has been completed, it is determined that the washing mode has been completed, and diagnostic data about "Wash" is stored before rinsing starts, i.e., before water supply starts in the rinsing mode.

"Rinse" indicates product information having an attribute that should be sampled in the rinsing mode. "Rinse" is 4 bytes long. "Spin" indicates product information having an attribute that should be sampled in the spin-drying mode. Data about rinsing is stored while the rinsing mode is performed, when the rinsing mode is completed, or when an error has occurred. Rinsing data is stored during each rinsing operation and diagnostic data about rinsing is finally stored before the spin-drying mode starts after spinning is performed in the last rinsing operation.

Here, "Spin" is set to be 6 bytes long. "Dry" indicates product information having an attribute that should be sampled in the drying mode. "Dry" is set to be 8 bytes long. Diagnostic data about spin-drying is stored when the spin-drying mode has been completed or when an error has occurred.

In the washing, rinsing, and spin-drying mode, diagnostic data about bubble detection is stored immediately upon bubble detection.

"Error code" indicates a code of an error, of which the user is alerted upon detection of an abnormality in the laundry treatment machine 101 while in operation. That is, "Error code" indicates a typical operation error of the laundry treatment machine 101, of which the user is alerted when an abnormality has occurred in the laundry treatment machine 101. "Error code" is set to be 1 byte long.

For example, "Error code" indicates an error message displayed on a display (not shown) or a beep emitted through a buzzer when the laundry treatment machine 101 has malfunctioned or a usage error has occurred. Among product information, such an error code is set to inform the user of the location of an error in the laundry treatment machine 101 which has malfunctioned. The error code may not only be displayed on the display device but may also be output as an alarm sound.

For example, when an error code included in product information has a data value of 0, the error code indicates that the laundry treatment machine 101 is functioning normally or indicates that a malfunction, which is not classified as an error code, has occurred in the laundry treatment machine 101. An error code having a data value of "1" may indicate a door malfunction, "2" a water supply malfunction, "3" a drainage malfunction, "4" a balance malfunction, "5" an FE malfunction, "6" a switch sensor (PE) malfunction, "7" a water supply (IE) malfunction, "8" a motor (LE) malfunction, a "9" CE malfunction, and "10" a drying malfunction. Error codes having other data values may indicate other specific malfunctions.

Such an error code is used to extract associated data according to the value of the error code when the diagnostic server has diagnosed the laundry treatment machine 101 with a fault, to compare the extracted data with corresponding reference data or diagnostic data to analyze the cause of the fault, and to derive a measure to take against the fault. The diagnostic server determines an operation of the laundry treatment machine 101 during which the fault has occurred based on state information included in the product information.

"Counts" indicates product information specifying the number of uses of the laundry treatment machine 101 by the user, the number of error occurrences, etc. "Counts" is set to be 8 bytes long. When the laundry treatment machine 101 has started operation, "Counts" is not initialized, maintaining its previous value, at a preparatory step.

"Options" indicates product information including options that the user has set when operating the laundry treatment machine 101. That is, the user sets "Options" for the laundry treatment machine 101, for example, a washing time to 15 minutes, a spin-drying time to 5 minutes, and a rinsing time to 10 minutes as "Options". "Options" is set to be 9 bytes long. "Options" are stored when an error code has occurred or when the washing mode has been completed.

The sizes, categories, and names of product information are merely an example and thus may be changed depending on the characteristics of the home appliance.

The main controller 141 causes the home appliance to operate according to setting values such as options or an operation course set through the manipulator 117 of the input device 125. For example, when the home appliance is a laundry treatment machine, the main controller 141 classifies its operation steps into preliminary, washing, rinsing, spin-drying, drying, and termination steps and further classifies each step into operations and stores information indicating an operation that the home appliance has performed last as state information.

Thus, the state information includes information about the operation that the home appliance has performed last among all operations of the home appliance. For example, the state information includes information about an operation step that the home appliance performs last among preliminary, washing, rinsing, spin-drying, drying, and termination steps into which operation steps of the laundry treatment machine are divided before the laundry treatment machine performs specified operations. Here, each step may be classified into sub-steps. For example, the washing step may be further classified into rough washing, soaked washing, main washing, and finishing washing steps and the rinsing step may be further classified into first-time rinsing, second-time rinsing, third-time rinsing, and fourth-time rinsing steps. The first-time rinsing step may also be further classified into a drainage step, a brief spinning step, a main spinning step, and a water supply step. The state information includes information about such finely classified operations of the home appliance.

When an abnormality has occurred during the rinsing mode of the laundry treatment machine, a value indicating the rinsing mode is stored in the state information since the rinsing mode has been performed last. Here, each mode may be further classified and thus the state information may indicate in which rinsing step the abnormality has occurred in the rinsing mode, whether the abnormality has occurred during the spinning step in the rinsing mode, whether the abnormality has occurred during water supply, and whether the abnormality has occurred during drainage.

Here, the state information may be about 1 byte long and may include information about each of about 60 to 64 operations into which the steps of the home appliance are divided.

Here, the values "0" to "5" of state information may indicate operations of a preliminary step, specifically, the value "0" may indicate an initialization step, "2" a stop step, "3" a course scheduling step, "4" a freezing detection step, and "5" a laundry quantity detection step. The values "55" and "56" may indicate drying steps, specifically, the value "55" may indicate a hot air drying step and "56" a cool-down step.

The values "6" to "9" may indicate the rough washing mode, "10" and "11" the soak mode, "12" to "20" the wash mode, "21" to "48" the rinsing mode", "49" to "52" the spin-drying mode, "55" and "56" the drying mode, and "57" to "59" the termination mode. When the data value of the state information is "0", this indicates that power is off and, when the data value is "12", this indicates that initial water supply has been performed last in the washing mode. When the value of the state information is "28", this indicates that brief spinning has been performed last in the second-time rinsing step.

This state information is updated as needed during operation of the home appliance. That is, while the washing mode is being performed, corresponding state information is stored and, when the rinsing mode is performed after the washing mode is completed, a corresponding value is stored as state information.

The diagnostic server can determine which operation has been performed last in the home appliance through the state information included in the product information and perform fault diagnosis using associated diagnostic data.

Common data described above is stored in the storage device 146 immediately each time data is created or each time the value of data has changed. Common data is temporarily stored in the storage device 146 and is then stored in the memory 145 when the home appliance has stopped operation since all operations are completed or since an error has occurred.

"Current Limit Counter" indicates the total number of current limit operations until the home appliance terminates operation after starting operation. The current limit counter is incremented by 1 each on-off cycle of the motor.

When the motor controller generates and applies a signal for controlling the motor to the motor, an excessive current exceeding an allowable level may be generated, damaging the motor controller and the motor. Thus, the motor controller performs a "current limit" operation to forcibly cut off a motor current when the level of the current has reached a limit level which is preset to prevent damage to the motor controller and the motor due to overcurrent.

"FO Counter," which is an overcurrent control counter, indicates the total number of times overcurrent is cut off by hardware until the home appliance terminates operation after starting operation. The FO limit counter indicates the number of times overcurrent is limited by hardware and is maintained at "0" when the motor controller performs normal control. Thus, when the value of the FO counter is zero, this indicates that the motor controller is functioning normally and, when the value of the FO counter is nonzero, this indicates that an error has occurred in the motor controller, i.e., that the motor controller is out of order.

"Bubble_Counter" indicates the total number of times bubble detection is performed until the home appliance terminates operation after starting operation.

"RPM Detect" indicates a rotation speed value of the motor that a hall sensor provided for the motor has measured during operation of the motor. The RPM Detect data enables determination of abnormality in the motor or hall sensor. For example, when the current limit counter is nonzero while the "RPM Detect" value is zero indicating that no rotation speed has been measured, it can be determined that the hall sensor has failed to measure the rotation speed since the hall sensor is out of order although the motor has been activated.

Here, an "RPM Detect" value of "0" indicates that the hall sensor and the motor are normal, "1" indicates that the RPM is 0, and "2" indicates that the RPM is kept at 0 for the last two seconds or that the RPM was nonzero at least once for the remaining time.

The "RPM Detect" value is stored each time it is detected and thus an "RPM Detect" value stored last is maintained as a final motor speed measurement.

"Power off info" includes information as to whether the home appliance has terminated operation when power is turned off after completing all set operations or without performing part of the set operations. For example, the value of "Power off info" may be 1 when power is turned off due to power failure.

"Water Level End" includes water level measurement of the tub when the home appliance has terminated operation.

"Error Water Drainage Time" indicates the time required for drainage (drainage time) and, specifically, a drainage time that was stored last is stored in this information upon occurrence of an error. The "Error Water Drainage Time" value is changed when drainage is performed and the larger of a previously stored value and a newly measured value is stored as the "Error Water Drainage Time" value. Thus, the maximum time required for drainage is stored as the error water drainage time information. That is, the longest of the drainage times measured when drainage was performed a number of times is stored as the "Error Water Drainage Time" value.

Namely, the "Error Water Drainage Time" value indicates the longest of all operation times required for drainage which are measured during drainage operations and thus a measured drainage time value is stored when it is greater than a previously stored value such that the maximum drainage time is stored as the "Error Water Drainage Time" value.

"IPM Max Temperature" indicates a measured temperature of the motor controller that applies a control signal to the motor. While the motor controller generates and applies a motor control signal to the motor, the motor controller generates heat since it performs a large amount of calculation. The temperature of the motor controller is measured and recorded since the motor controller may be damaged when the temperature has exceeded a certain level.

"Error Temperature" includes information about a temperature sensor, which has measured an abnormal temperature or a temperature error, among a plurality of temperature sensors provided in the home appliance. For example, an error temperature value of "0" indicates that there is no abnormality, "1" indicates a temperature sensor provided on the tub, "2" indicates a temperature sensor provided on an AF, and "3" indicates a temperature sensor provided on a duct. Here, the order or types of temperature sensors corresponding to the error temperature values may be changed according to setting.

That is, the error temperature value "1" indicates that an abnormal temperature is measured at the temperature sensor provided on the tub.

Here, each temperature sensor provided on the home appliance applies data corresponding to a measured temperature to the main controller. The value input to the main controller is not the measured temperature level but instead is a corresponding one of 255 levels into which resistance, current, or voltage values corresponding to temperature are classified.

When a value measured by a temperature sensor is 0 or 255, the main controller may determine that the temperature sensor is out of order since the values 0 and 255 cannot be measured when the temperature sensor operates normally and are measured due to a wiring or connection problem. The value 0 or 255 may also be applied to the main controller when temperature exceeds a range of temperature levels that can be measured by the temperature sensor. In the case of the laundry treatment machine, such abnormal data is applied to the main controller when temperature of a dryer heater exceeds the measurable range of a temperature sensor provided on the dryer heater due to overheating caused by failure of the fan. Thus, the main controller stores information of the temperature sensor as the error temperature information.

"Error Bubble Flag" indicates whether bubbles have been detected upon error occurrence and is set when bubbles have been detected and is cleared when bubbles have been removed.

"Error Voltage" indicates a voltage value measured upon error occurrence. A generally measured voltage value is not stored as the "Error Voltage" value. Instead, the measured voltage value is converted into one of a plurality of levels into which measured voltage values are classified and the converted level is stored as the "Error Voltage" value.

"Fan motor RPM" indicates a rotation speed of the fan motor when an error code has occurred. The rotation speed of the fan motor is measured, before the fan motor is deactivated, and the fan motor is deactivated after the measured rotation speed is stored as the "Fan motor RPM" value.

Specifically, when the cool-down step is entered, the rotation speed of the drying fan in the laundry treatment machine is measured and stored as the "Fan motor RPM".

"ReWater Flag" is set during water resupply and is cleared when water resupply is completed. The "ReWater Flag" value is stored when an error has occurred or when the operation is terminated. The "ReWater Flag" value is set depending only on whether water resupply is being performed, regardless of whether water resupply is performed in the washing step or in the rinsing step.

"Door Bimetal Flag" stores an on/off state of a bimetal on the door when a door-related error has occurred.

Data used in the overall operation of the laundry treatment machine as described above is temporarily stored and updated as needed and is stored in the memory when an error has occurred or when the operation is terminated.

The diagnostic data includes data items corresponding to operations which are stored according to operating states.

In the operation steps of the washing mode, a wash water supply time, a wash water temperature, a wash bubble flag, a wash low-voltage flag, a wash valve switching flag, and a heater forcible cut-off flag are stored as diagnostic data of the washing mode. These data items are temporarily stored and updated during the washing mode and are stored in the memory when washing is completed.

Here, the wash water supply time data "Water supply time_W" is the time required for water supply in the initial water supply step, i.e., the time required until water supply is completed after water supply starts. The stored wash water temperature data includes a first wash water temperature "Water Temperature W0" and a second wash water temperature "Water Temperature W1". Here, a temperature of the tub when the operation starts is stored as the first wash water temperature and a temperature of the tub immediately after the initial water supply is completed is stored as the second wash water temperature. That is, the first wash water temperature "Water Temperature W0" is a temperature of the tub that is measured when the operation starts, i.e., when water supply starts. The first wash water temperature is not measured when water supply is resumed after being stopped. On the other hand, the second wash water temperature "Water Temperature W1" is a temperature of the tub that is measured immediately after the initial water supply is completed. The temperature of the tub can be considered the temperature of the wash water since the temperature of the tub varies with the temperature of the wash water when water supply is performed. Whether the state of water supply, the sensor, or the like are out of order is determined by comparing the two wash water temperatures.

The wash bubble flag indicates whether or not bubbles have occurred during washing and spinning in the washing mode and may be set to "1" when bubbles have occurred and set to "0" when no bubbles have occurred. The wash low-voltage flag is set when a low voltage has been input. The wash valve switching flag is a flag associated with erroneous connection of cold and hot water valves. The heater forcible cut-off flag is set to a value indicating whether the heater has been forcibly cut off based on the heating time. Specifically, the heater forcible cut-off is stored as a history of forcible cut-off of the heater due to an excessive heating time and forcible cut-off of the heater due to no temperature change. When the heater has been cut off at least once, the heater forcible cut-off flag is set to "1", indicating that forcible heater cut-off has occurred.

Diagnostic data of the rinsing mode includes a rinse water supply time, a rinse water temperature, a rinse bubble flag, a rinse low-voltage flag, and main rinse valve information and are temporarily stored and updated while the rinsing mode is being performed or when the rinsing mode is completed and are finally stored in the memory when the rinsing mode is completed.

The time required for water supply for rinsing is stored as the rinse water supply time as in the washing mode. When rinsing is performed a plurality of times, the maximum of a plurality of measured rinse water supply times is stored as the rinse water supply time. The rinse water temperature data includes a first rinse water temperature and a second rinse water temperature, which are tub temperatures measured respectively before and after water supply, as in the washing mode. The temperature difference between before and after water supply can be determined using the first and second rinse water temperatures.

The rinse bubble flag is set or cleared according to whether bubbles have occurred during rinsing. The rinsing low-voltage flag is set when a low voltage is generated during rinsing or spinning in the rinsing mode. The main rinse valve information includes information indicating whether the main valve used for final rinsing is a cold water valve or a hot water valve.

Diagnostic data of the spin-drying mode includes a spin-dry entry trial count "UB try counter", a wet load level, an offset value, a target rotation speed, a maximum rotation speed, a spin-dry bubble flag, and a spin-dry low-voltage flag and are stored while the spin-drying mode is being performed or when the spin-drying mode is completed.

First, the "UB try counter" value is described as follows. The tub or drum may bump against the casing of the laundry treatment machine when spin-drying is performed depending on how much the tub is tilted due to laundry. Large eccentricity of laundry may cause loud noise and makes high-speed spin-drying impossible and may also damage the laundry treatment machine. Accordingly, the degree of balance or unbalance (or eccentricity) is measured before spin-drying is performed. When the degree of unbalance or eccentricity is great, the laundry treatment machine does not directly start spin-drying and performs an operation for untangling and uniformly redistributing laundry. That is, the "UB try counter" data indicates the number of times the laundry treatment machine has reattempted entry to the spin-drying step since it cannot perform the spin-drying operation due to large eccentricity. This is proportional to the number of times the laundry treatment machine has performed eccentricity measurement and laundry untangling.

The "Wet load level" data indicates the quantity of laundry measured last before high-speed spin-drying is performed. Since the laundry quantity measured when washing starts is the quantity of dry laundry, the quantity of wet laundry before spin-drying is performed is recalculated and stored as the "wet load level" data.

The quantity of laundry may be classified into a plurality of levels such as very small, small, middle, normal, large, very large, and single load levels. The "offset value" is a value for setting a target rotation speed during spin-drying and the target rotation speed is reset based on the eccentricity (or the degree of unbalance), regardless of an initially input operation setting. The maximum rotation speed is a value measured when final spin-drying is performed.

The spin-dry bubble flag is associated with whether bubbles have occurred during spin-drying and the spin-dry low-voltage flag indicates whether a low voltage is generated during spin-drying.

Diagnostic data of the drying mode includes a lowest water level, a dryer heater operation count, a lowest dry temperature, a motor rotation speed, a lowest voltage, a dry time, a maximum fan motor rotation speed (RPM) flag, and a dry low-voltage flag and are stored while the drying mode is being performed or when the drying mode is completed.

The lowest water level is the lowest of water levels measured until the drying mode is completed from when initial drainage is completed after the drying mode is entered. The dryer heater operation count is the number of on and off operations of the dryer heater and the lowest dry temperature is the lowest of duct temperature values measured immediately until the cool-down step is entered.

The fan motor rotation speed "fan motor RPM" is a measured rotation speed value of the dry fan of the laundry treatment machine when the cool-down step is entered. The lowest dry voltage is the lowest of voltage values measured during the drying mode after the drying mode is entered. The dry time is a time measured after preliminary drying in the spin-drying mode. The maximum fan motor rotation speed flag is set when the rotation speed measured during operation of the fan motor has exceeded a predetermined speed and the dry low-voltage flag is set when a low voltage is provided in the drying mode.

The diagnoser 260 diagnoses a fault using such data included in the product information and derives a solution to the fault.

Not only data according to operations of the home appliance but also both an error occurrence count in the home appliance and setting data input through the manipulator 117 are included as diagnostic data in the product information.

The error occurrence count includes the number of occurrences of errors of each error code, the number of operations of the home appliance, the number of tub washing operations of the laundry treatment machine, or the like. The setting data includes setting values associated with a wash course, a rinsing operation count, a language for use, use of steam, sound volume control, spin-drying strength, and wash water temperature.

The main controller 141 stores such diagnostic data as product information in the memory. When the home appliance enters the smart diagnosis mode in response to input by the user, the main controller 141 reads the stored diagnostic data and creates product information and the encoder 142 encodes the product information to generate a digital signal in a predetermined format. The generated digital signal is applied to the modulator, which converts the digital signal into a combination of predetermined frequency signals. The sound output device 160 outputs the combination of predetermined frequency signals as a predetermined sound signal.

Figure 5:
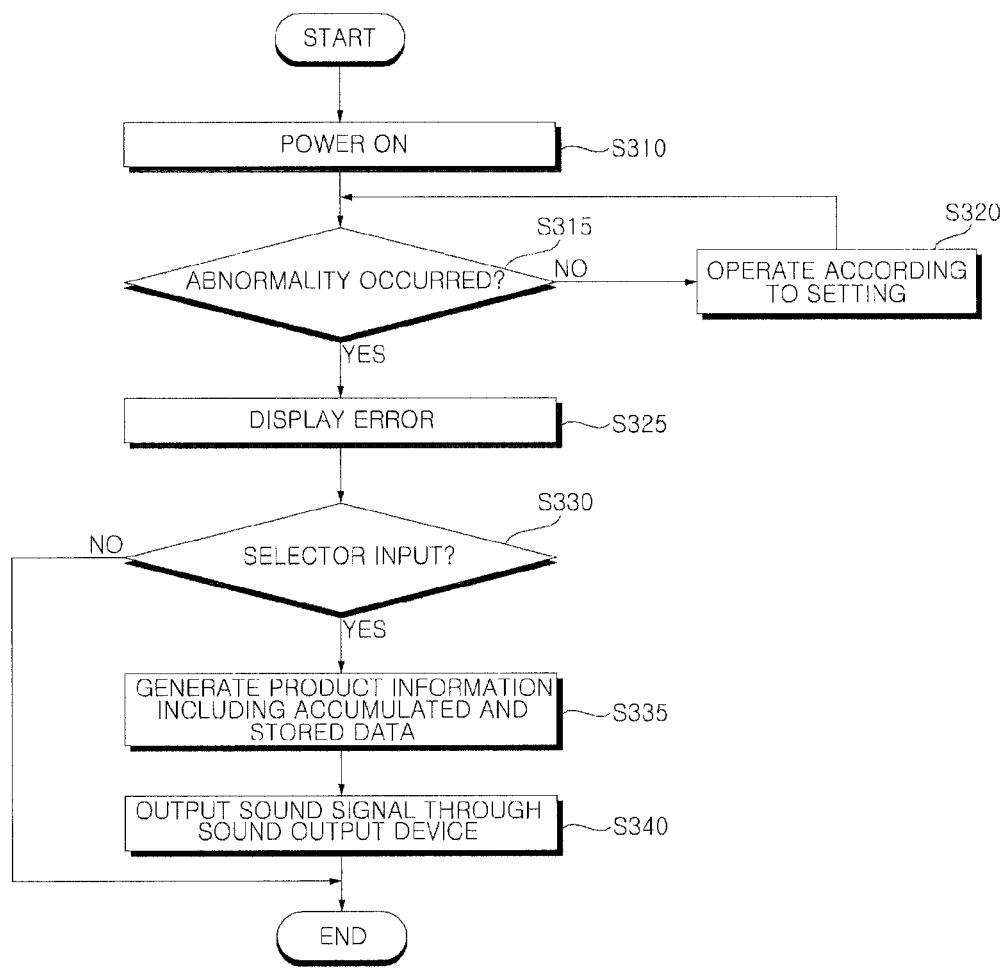
FIG. 5 is a flow chart illustrating a method for outputting a sound signal including product information of a home appliance according to the present invention.

FIG. 5 is a flow chart illustrating a method for outputting a sound signal including product information of a home appliance according to the present invention.

As shown in FIG. 5, when a power key is input, operation setting of the home appliance is performed according to the input data and the home appliance operates according to the setting (S310). The home appliance stores data generated and data measured during operation of the home appliance.

When an abnormality has occurred during operation of the home appliance (S315), the home appliance stops operation and displays an error (S325). When no abnormality has occurred during operation of the home appliance, the home appliance continues operation according to the setting (S320).

The home appliance enters a smart diagnosis mode when the user has operated the selector 130 provided on the home appliance to input a fault diagnosis command (S330). Here, while the user has input the selector 130 after an error is displayed in this manner, the home appliance may also enter the smart diagnosis mode when the user has input the selector 130 without occurrence of an error. However, the home appliance may not enter the smart diagnosis mode according to operation of an operating key of the manipulator 117 before the selector 130 is input.

The main controller 141 of the home appliance stores temporary data stored in the storage device 146 in the memory 145 and collects diagnostic data stored in the memory 145 and applies the collected diagnostic data to the encoder 142. The encoder 142 adds version information and a product number to the diagnostic data to generate product information (S335).

The encoder 142 generates a digital signal in a predetermined format after encoding the product information and applies the digital signal to the modulator 150. The modulator 150 allows a frequency signal corresponding to a logic value of the digital signal to be output to the sound output device 160. Accordingly, a sound signal including the product information is output through the sound output device 160 (S340).

The sound signal output in this manner is input to the portable terminal 80 which is connected to the service center 200 over a communication or telephone network and the input sound signal is transmitted to the service center 200. The service center 200 performs fault diagnosis on the home appliance using the sound signal.

Figure 6:
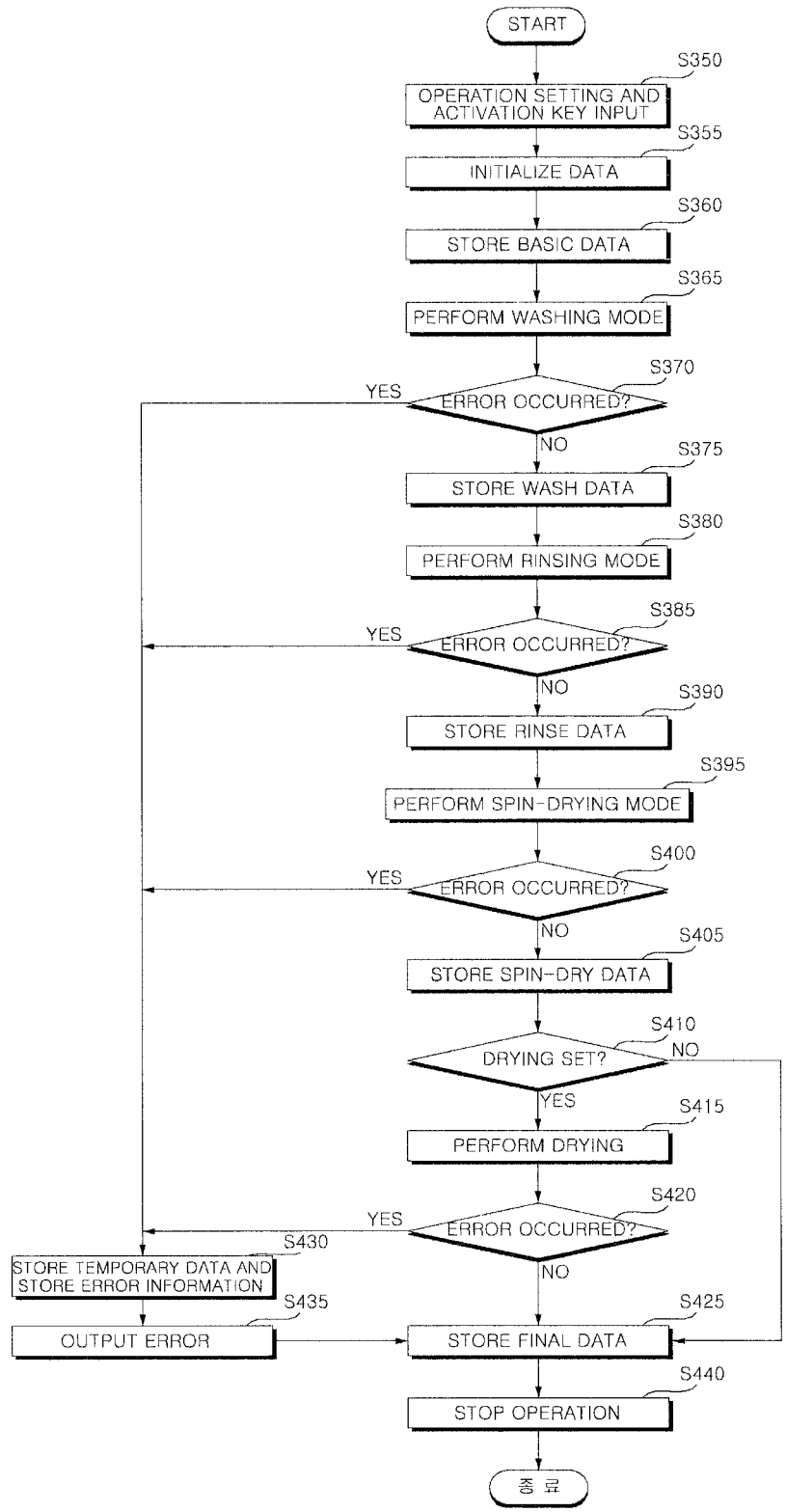
FIG. 6 is a flow chart illustrating a method for storing data in a home appliance.

FIG. 6 is a flow chart illustrating a method for storing data in a home appliance.

As shown in FIG. 6, an operation setting of the home appliance is input through the manipulator 117 and an activation key is then input (S350). The main controller 141 initializes stored data items (S335) and stores initial values of the data items (S360). An initial value of specific diagnostic data is not set as needed.

For example, referring to the attributes of Table 1, the initial value of a counter storing the number of operations or the number of errors is not specified but instead the value of the counter is accumulated (i.e., stored in an accumulated manner), while initial values of diagnostic data about state information, common, wash, rinse, spin, dry, error code, and options are specified.

When an error code has occurred in a previous operation, corresponding data is maintained without being initialized.

The main controller 141 applies a control command to the driver 180 and the driver 180 allows the home appliance to operate according to the operation setting. When the home appliance is a laundry treatment machine, the laundry treatment machine performs a washing mode according to the operation setting (S365).

In a procedure in which washing is performed after water supply, the sensing device 170 measures a water temperature, a water level, and a motor rotation speed and applies the measured values to the main controller 141 or the driver 180. The main controller 141 stores data generated and data measured during the washing mode in the memory 145 or temporarily stores the same in the storage device 146.

For example, the data stored during in the washing mode includes a wash water supply time, a wash water temperature, a wash bubble flag, a wash low voltage flag, a wash valve switching flag, and a heater forcible cut-off flag. These data items are temporarily stored or updated during the washing mode.

When an error has occurred during the washing mode (S370), the main controller 141 stores temporary data in the memory 145 and stores an error code corresponding to the error, data associated with the error, and data associated with state information in the memory 145 (S430). The display device 118 outputs the error according to a control command from the main controller 141 (S435).

When the washing mode is normally completed, the main controller 141 stores the washing mode related data temporarily stored in the storage device 146 as diagnostic data in the memory 145 (S375).

After the washing mode is completed, the main controller 141 performs a rinsing mode (S380). The washing mode is performed by repeating a procedure of water supply, rinsing, and spinning 2 to 4 times. Data generated or measured in each rinsing step is stored in the memory 145 or is temporarily stored in the storage device 146.

For example, the diagnostic data about the rinsing mode includes a rinse water supply time, a rinse water temperature, a rinse bubble flag, a rinse low-voltage flag, and main rinse valve data.

When an error has occurred during the rinsing mode (S385), the main controller 141 stores temporary data in the memory 145 and stores an error code corresponding to the error and data associated with the error in the memory 145 (S430). The display device 118 outputs the error according to a control command from the main controller 141 (S435).

When the rinsing mode is normally completed, the main controller 141 stores the rinsing mode related data temporarily stored in the storage device 146 as diagnostic data in the memory 145 (S390). Although the diagnostic data about the rinsing mode is stored in the memory 145 after the rinsing mode is completed, part of the diagnostic data may also be stored in the memory 145 during the rinsing mode.

When the specified steps of the rinsing mode are all completed, the spin-drying mode is performed (S395).

The driver 180 rotates the tub or drum at a high speed to remove water from the laundry. Here, spin-dry data generated during the spin-drying mode is temporarily stored in the storage device 146 or is stored in the memory 145.

Diagnostic data of the spin-drying mode includes a spin-dry entry trial count "UB try counter", a wet load level, an offset value, a target rotation speed, a maximum rotation speed, a spin-dry bubble flag, and a spin-dry low-voltage flag.

When an error has occurred during the spin-drying mode (S400), the main controller 141 stores temporary data in the memory 145 and stores an error code corresponding to the error and data associated with the error in the memory 145 (S430). The display device 118 outputs the error according to a control command from the main controller 141 (S435).

When the spin-drying mode is completed, the main controller 141 stores the temporarily stored data as diagnostic data of the spin-drying mode in the memory 145 (S405).

After the spin-drying mode is completed, the main controller 141 determines whether a drying mode has been set. When a drying mode has been set, the main controller 141 performs the drying mode to completely remove water or moisture from the laundry according to the setting (S415). The main controller 141 stores drying mode related data in the memory 145 or temporarily stores the data in the storage device 146.

When an error has occurred during the drying mode (S420), the main controller 141 stores temporary data in the memory 145 and stores an error code corresponding to the error and data associated with the error in the memory 145 (S430). The display device 118 outputs the error according to a control command from the main controller 141 (S435).

When the spin-drying mode is completed, the main controller 141 stores the temporary data associated with the drying mode as diagnostic data in the memory 145 (S405).

As described above, diagnostic data associated with each of the washing, rinsing, spin-drying, and drying modes is stored in the memory 145 while the mode is performed or after the mode is completed and common data is stored in the memory 145 when needed or immediately upon generation of the common data. In addition, when an error has occurred, associated data is stored immediately.

When all operations are completed, the main controller 141 finally stores diagnostic data associated with the overall operations of the home appliance (S425).

When the operation of the home appliance is normally completed according to the operation setting or when an error has occurred, the main controller 141 stores data and stops operation of the home appliance (S440).

On the other hand, when the operation setting is changed while the home appliance operates as described above, the main controller 141 updates data according to the change. However, when a washing course is changed, the main controller 141 may initialize the data.

The diagnostic data stored as described above is used as product information when the home appliance has entered the smart diagnosis mode as the selector 130 is input as described above with reference to FIG. 5 and is output as a predetermined sound signal through the sound output device 160 after being subjected to encoding and modulation processes. The diagnostic server of the service center 200 receives and demodulates the output sound signal to extract product information and analyzes a plurality of diagnostic data included in the product information to perform fault diagnosis on the home appliance.

Figure 7:
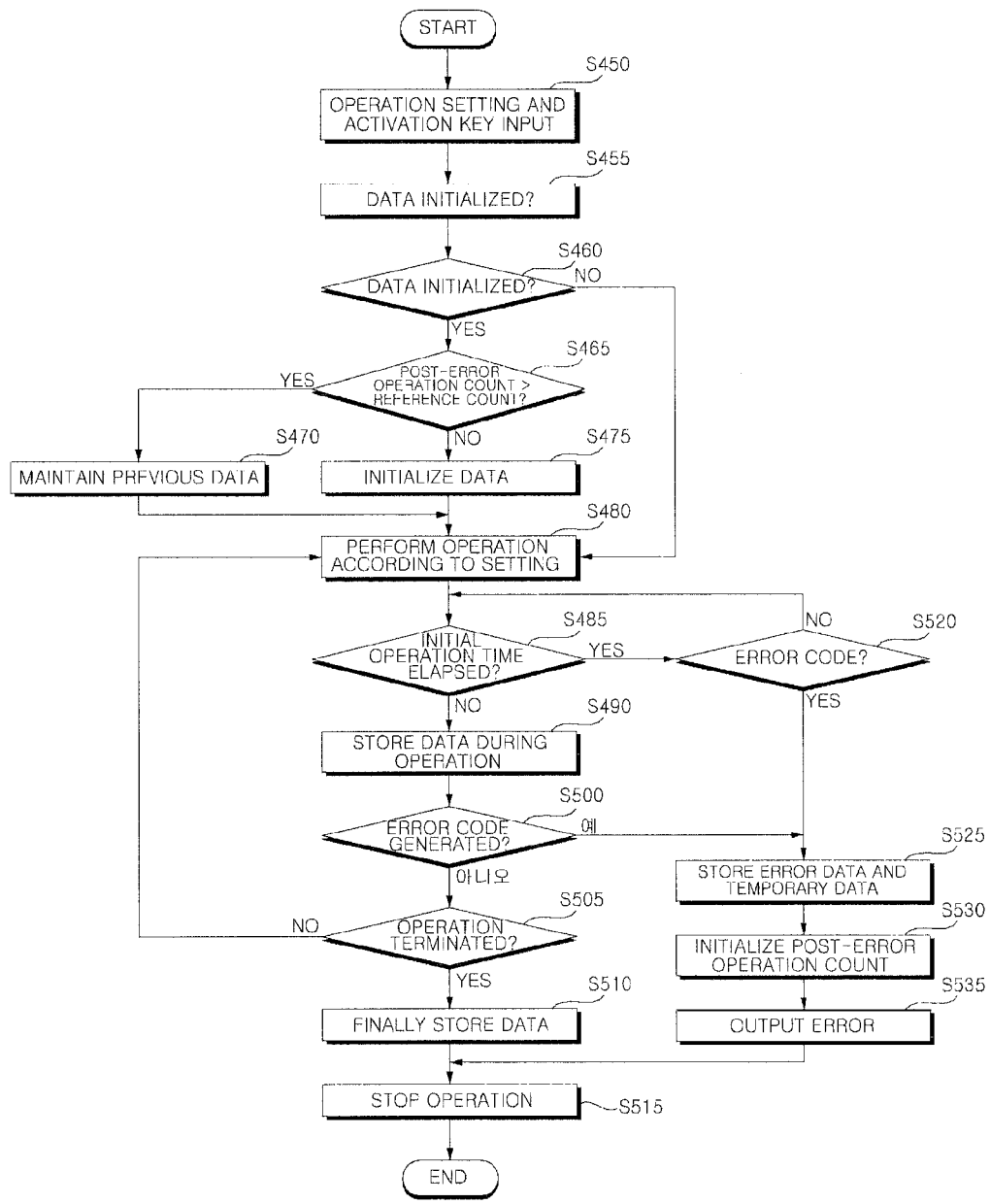
FIG. 7 is a flow chart illustrating a method for initializing data in a home appliance.

FIG. 7 is a flow chart illustrating a method for initializing data in a home appliance.

As shown in FIG. 7, when an operation setting is input and an activation key is input as described above (S450), the main controller 141 increments a counter value indicating a post-error operation count among diagnostic data (S455). Here, the post-error operation count indicates the sequence of the current operation after an error has occurred and is incremented each time the activation key is input. That is, the post-error operation count is incremented by one when the activation key is input after an error has occurred. When the post-error operation count is 3, this may indicate a third operation after the error has occurred. Here, the time when the post-error operation count is stored may be changed.

The main controller 141 determines whether data initialization has been performed in a preliminary step (S460) and compares the post-error operation count with a reference count when data initialization has not been performed (S465). When the post-error operation count is equal to or less than the reference count, the main controller 141 maintains diagnostic data corresponding to the time when the error code has occurred without initialization (S470). For example, when the reference count is 3, the main controller 141 maintains diagnostic data corresponding to the time when the error code has occurred until a third operation is performed after the error has occurred.

When the post-error operation count has exceeded the reference count, the main controller 141 initializes the data (S475). However, the main controller 141 maintains diagnostic data associated with the count without initialization.

When the preliminary step is completed, the home appliance operates according to the input operation setting (S480).

The main controller 141 temporarily stores data generated during the operation of the home appliance in the storage device 146 and determines whether an initial operation time has elapsed after the operation starts (S485). When the initial operation time has not elapsed, the main controller 141 determines that the data temporarily stored in the storage device 146 is not valid and thus maintains the temporary storage state of the data. When the initial operation time has elapsed, the main controller 141 determines that the data temporarily stored in the storage device 146 is valid and thus stores the temporarily stored data as diagnostic data in the memory 145 (S490).

When an error code has occurred during operation of the home appliance (S500) or when an error code has occurred before the initial operation time has elapsed (S520), the main controller 141 stores data associated with the error, the temporary data, and the error code (S525). Since a new error has occurred, the main controller 141 initializes the post-error operation count (S530) and outputs an alert about the error (S535).

The home appliance stops operation when the error is output (S515).

Until the set operation is terminated without occurrence of an error code (S505), the home appliance operates according to the setting and data generated or measured during the operation is stored as diagnostic data in the memory 145 (S480 to S505).

When the operation is terminated, the diagnostic data is finally stored (S510) and the home appliance stops operation (S515).

Figure 8:
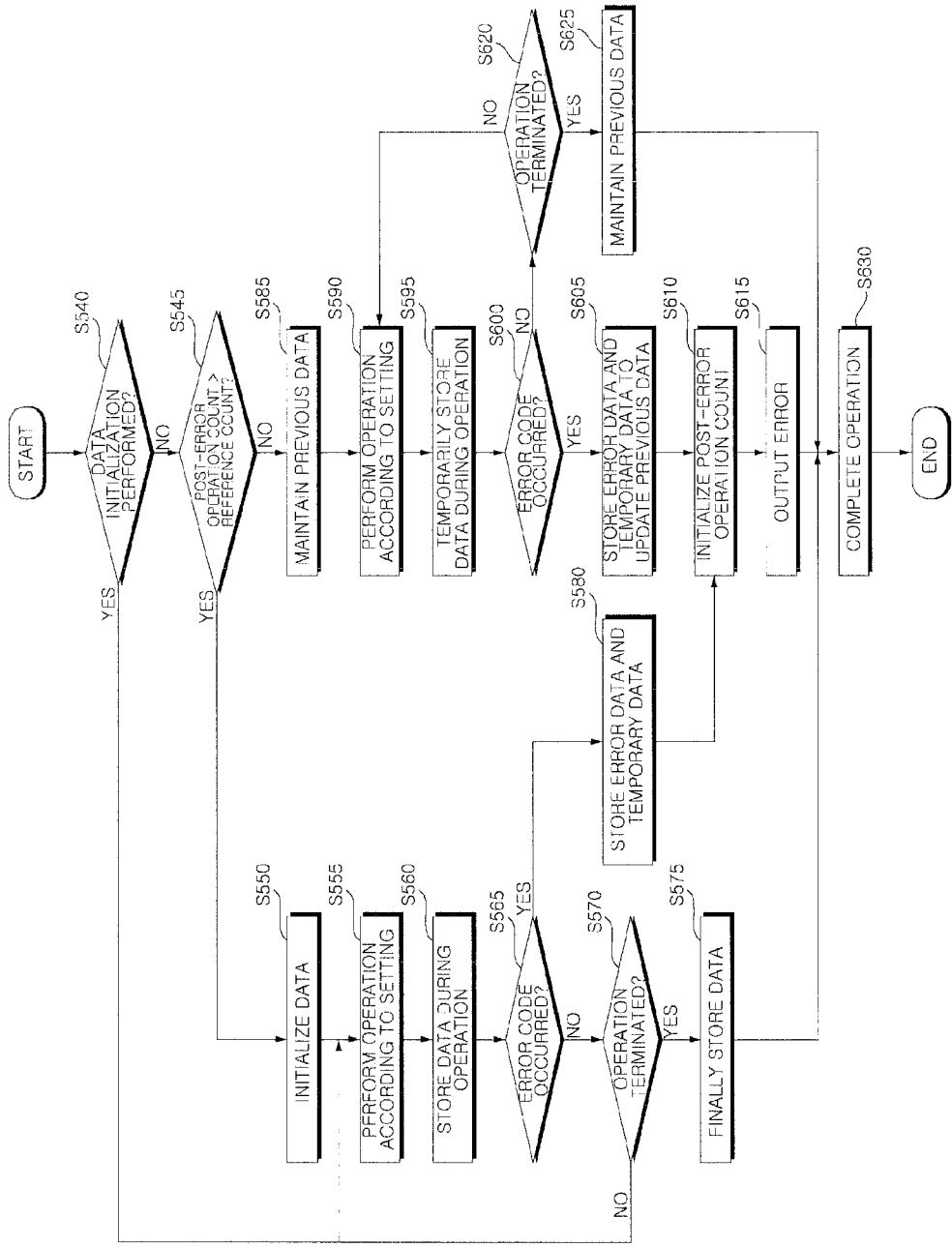
FIG. 8 is a flow chart illustrating a method for storing data according to an error occurrence history of a home appliance.

FIG. 8 is a flow chart illustrating a method for storing data according to an error occurrence history of a home appliance.

As shown in FIG. 8, when the activation key is input to allow the home appliance to start operation, first, the main controller 141 determines whether data initialization has been performed in the preliminary step (S540), compares the post-error operation count with the reference count as described above when data initialization has not been performed (S545), and initializes the data when the post-error operation count has exceeded the reference count (S550).

When data initialization has been completed, the main controller 141 operates the home appliance according to the setting as described above with reference to FIG. 7 (S555) and stores data during the operation as diagnostic data (S560). Here, when an error code has occurred during operation, the main controller 141 stores error data and temporary data (S580), initializes the post-error operation count (S610), outputs an alert about the error (S615), and completes the operation (S630).

The main controller 141 stores data generated during operation of the home appliance without error occurrence as diagnostic data (S555 to S570) and finally stores the diagnostic data when the operation is terminated (S810) and then completes the operation (S630).

On the other hand, when the post-error operation count is equal to or less than the reference count, the main controller 141 maintains previous data (S585).

That is, the main controller 141 operates the home appliance according to the setting without data initialization while maintaining the diagnostic data stored in the previous operation (S590).

The main controller 141 temporarily stores data generated or measured during operation of the home appliance in the storage device 146 (S595). Here, the main controller 141 maintains the temporary storage state of the data in the storage device 146 without storing the same in the memory 145.

When an error code has occurred during the operation (S600), the main controller 141 updates previous data or initializes diagnostic data associated with the error occurrence to store diagnostic data associated with the new error in the memory 145 (S605). After initializing the post-error operation count (S610), the main controller 141 outputs an alert about the error (S615) and then completes the operation (S630).

When no error has occurred during operation, the main controller 141 allows the home appliance to continue operation according to the setting until it terminates the operation (S620) and temporarily stores data during the operation (S590 to S600).

When the home appliance terminates operation without an error with the previous diagnostic data maintained, the main controller 141 discards the temporarily stored data and maintains the previous data (S625).

That is, the post-error operation count is equal to or less than the reference count when an error occurrence history is present (i.e., when an error has occurred), the main controller 141 maintains previous data until a new error occurs and initializes data associated with the error occurrence when the post-error operation count has exceeded the reference count.

Thus, data corresponding to the time when an error has occurred is maintained until the number of operations that the home appliance has performed reaches the reference count or until a new error occurs, and a corresponding sound signal is output when the home appliance has entered the smart diagnosis mode in response to input of the selector 130.

Figure 9:
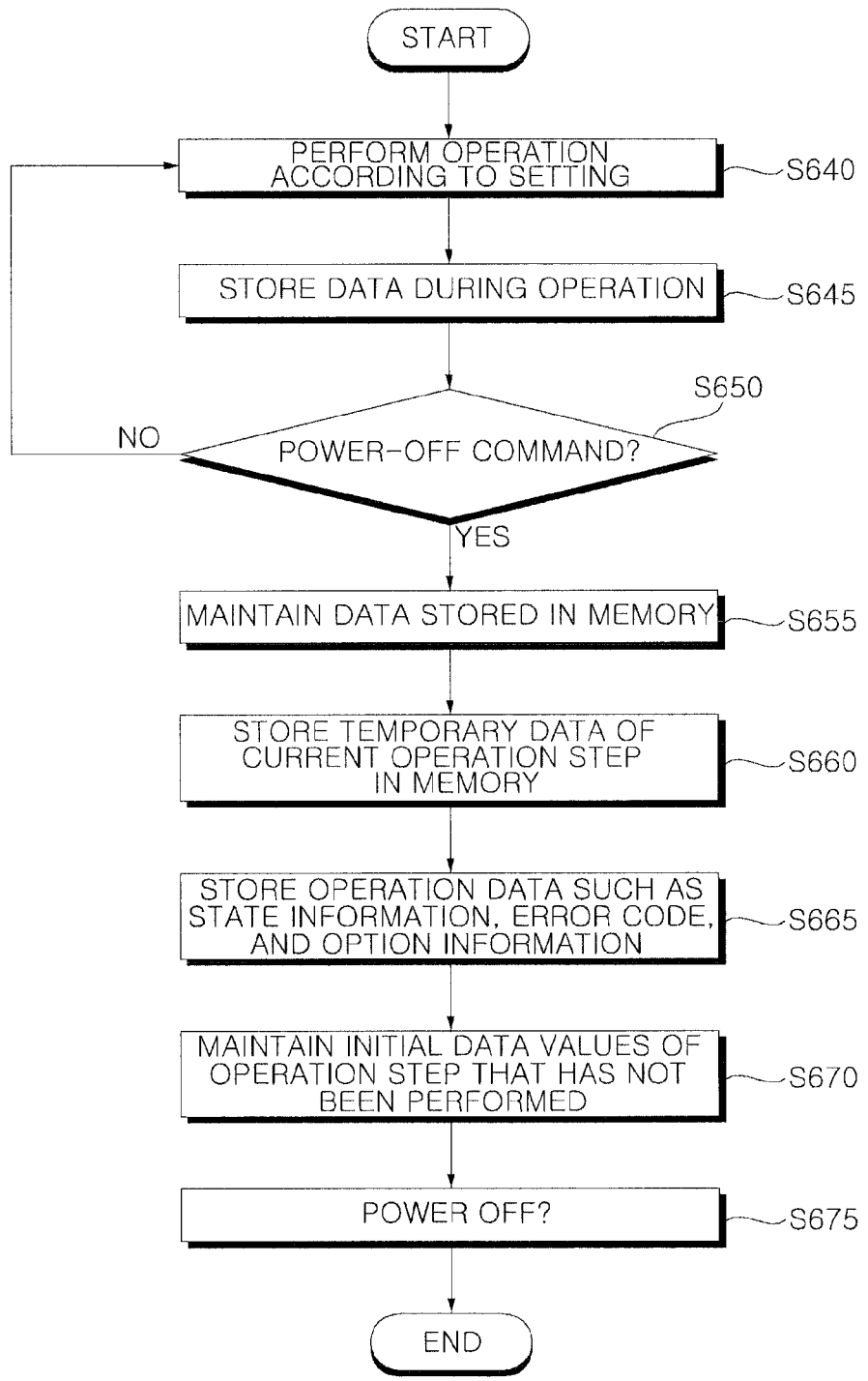
FIG. 9 is a flow chart illustrating a method for storing data in response to power-off of a home appliance according to the present invention.

FIG. 9 is a flow chart illustrating a method for storing data in response to power-off of a home appliance according to the present invention.

As shown in FIG. 9, the home appliance 101 operates according to an input setting (S640).

For example, when the home appliance is a laundry treatment machine, the laundry treatment machine sequentially performs washing, rinsing, and spin-drying modes according to an input wash course, a water temperature, an option setting, the detected amount of laundry, or detected eccentricity. Here, the main controller 141 initializes operation data as needed before the laundry treatment machine starts operation. However, previous diagnostic data, whose history needs to be maintained, such as error related data or count data is maintained without being initialized.

Data generated during operation is stored as diagnostic data in the memory 145 or is temporarily stored in the storage device 146 at least one of the time when the laundry treatment machine has not started operation, the time when each operation mode is completed, the time when all operations are completed, or the time when data is generated, depending on the type or attribute of the data (S645).

For example, data associated with the washing mode may be stored in the temporary storage device 146 when the data is generated and may then be stored as diagnostic data in the memory 145 when the washing mode is completed.

Here, when a power-off command is input while the laundry treatment machine performs an operation (S650), the main controller 141 maintains diagnostic data stored in the memory 145 (S655) and stores temporary data associated with the currently performed operation, which is stored in the storage device 146, as diagnostic data in the memory 145 (S660).

For example, when a power-off command is input while the laundry treatment machine performs a rinsing mode, the main controller 141 maintains diagnostic data stored in the memory 145 without change and reads temporary data associated with the rinsing mode from the storage device 146 and stores the read data in the memory 145. Here, the main controller 141 allows the laundry treatment machine to stop the operation.

In addition, the main controller 141 stores operation data such as state information associated with a currently performed operation mode, a related error code, operation related option information, or the like as diagnostic data in the memory 145 (S665). When the laundry treatment machine is in the rinsing mode, the main controller 141 stores, as state information, information indicating that the washing mode has been completed and information indicating that the rinsing mode is currently being performed. Here, the operation data stored in the memory 145 also includes records associated with stopping of the operation and power-off of the laundry treatment machine in response to the power-off command.

The main controller 141 maintains initial data values of an operation step that has not been actually performed although it has been set to be performed when the laundry treatment machine starts an initial operation (S670).

When data storage is completed as described above, the main controller 141 powers the home appliance off in response to the power-off command (S675).

Figure 10:
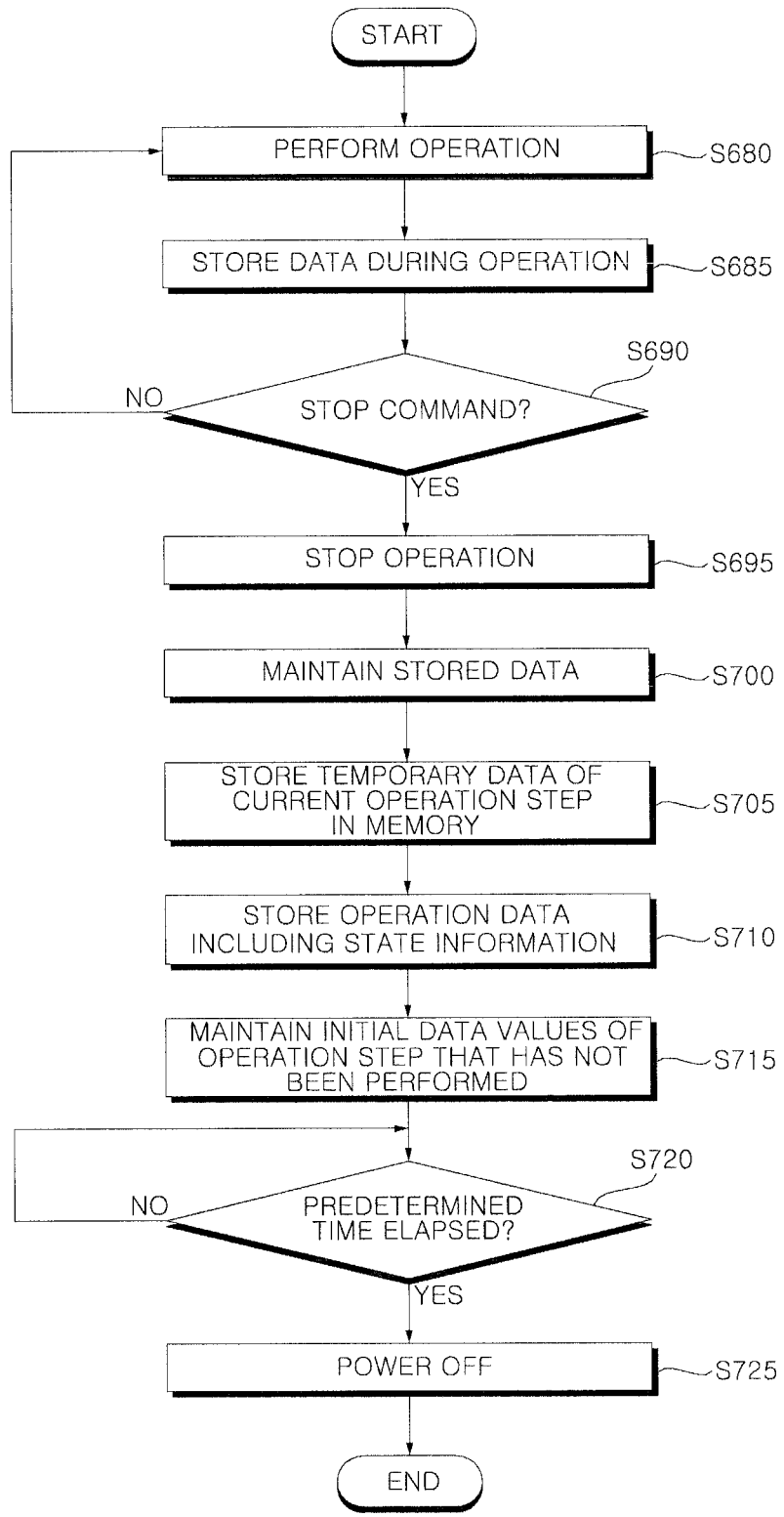
FIG. 10 is a flow chart illustrating a method for storing data according to a stop command in a home appliance according to the present invention.

FIG. 10 is a flow chart illustrating a method for storing data according to a stop command in a home appliance according to the present invention.

As shown in FIG. 10, the home appliance 101 operates according to an input setting as described above (S680). Before the laundry treatment machine starts operation, operation data is initialized and data associated with error occurrence or the like is maintained without being initialized as described above.

Data generated while the home appliance operates according to the setting is stored as temporary data in the storage device 146 or is stored as diagnostic data in the memory 145 at a specified time according to the type of the data (S685).

Specifically, data generated during operation is stored in the memory 145 or is temporarily stored in the storage device 146 at least one of the time when the laundry treatment machine has not started operation, the time when each operation mode is completed, the time when all operations are completed, or the time when data is generated, depending on the type of the data. For example, data associated with the washing mode may be stored in the temporary storage device 146 when the data is generated and the temporary data in the storage device 146 may then be stored as diagnostic data in the memory 145 when the washing mode is completed.

Here, when a stop command is input while the laundry treatment machine performs an operation (S690), the main controller 141 stops the current operation of the home appliance (S695) and maintains diagnostic data stored in the memory 145 (S700).

The main controller 141 stores temporary data associated with the current operation step, which is stored in the storage device 146, as diagnostic data in the memory 145 (S705).

The main controller 141 stores operation data including state information associated with the operation of the home appliance as diagnostic data in the memory 145 (S710). When the laundry treatment machine is in the rinsing mode, the main controller 141 stores, as state information, information indicating that the washing mode has been completed and information indicating that the rinsing mode is currently being performed.

The main controller 141 maintains initial data values associated with an operation step that has not been performed (S715).

When a predetermined time has elapsed after the home appliance stops operation in response to input of the stop command, i.e., when a start command is not input for a predetermined time or longer after the home appliance stops operation (S720), the main controller 141 turns the power of the home appliance off (S725).

When a restart command is input after the home appliance stops operation, the main controller 141 performs an operation according to the operation setting. That is, the main controller 141 resumes the stopped operation step and sequentially performs the next operations according to the operation setting.

Figure 11:
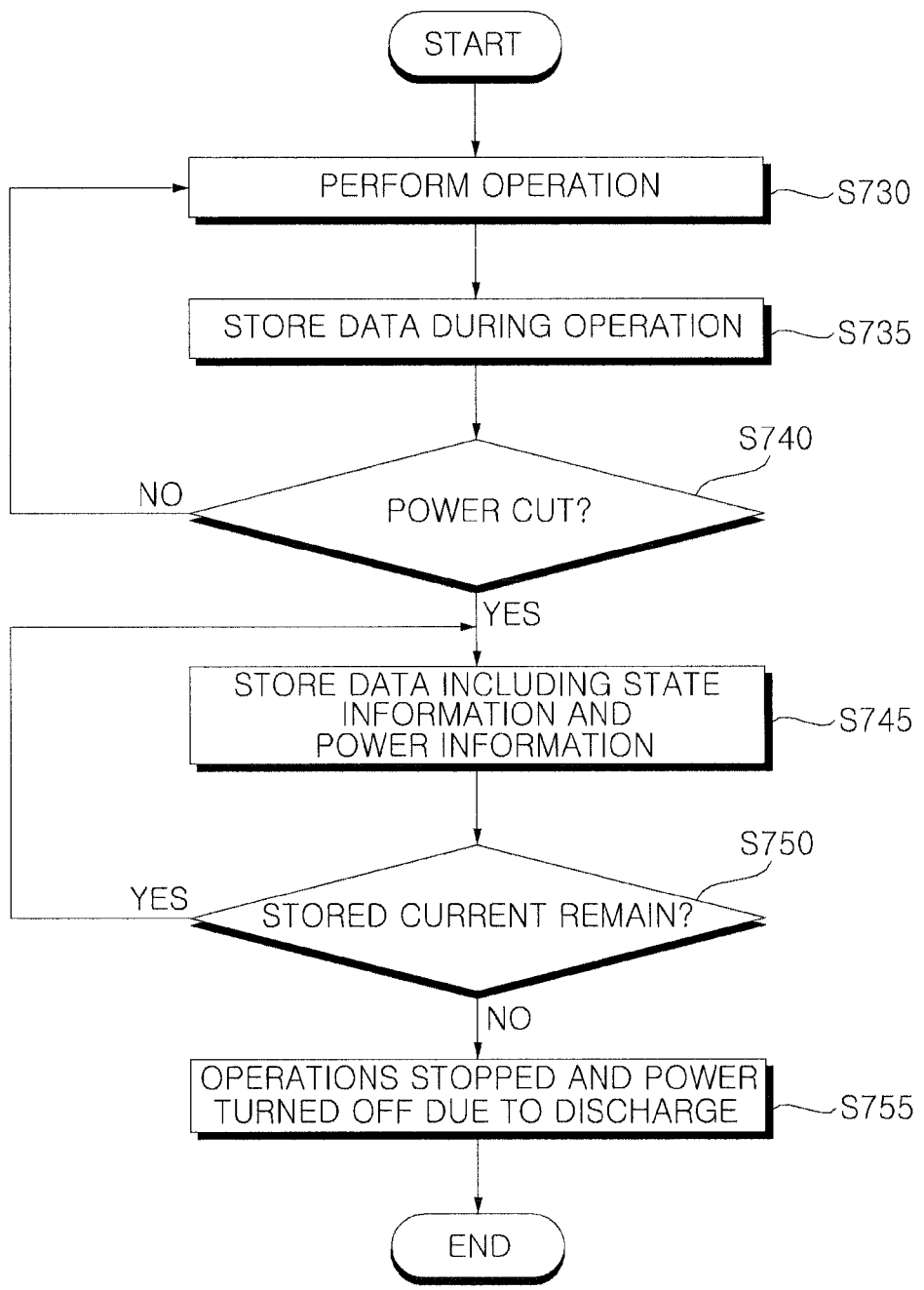
FIG. 11 is a flow chart illustrating a method for storing data according to power cut in a home appliance according to the present invention.

FIG. 11 is a flow chart illustrating a method for storing data according to power cut in a home appliance according to the present invention.

As shown in FIG. 11, the home appliance 101 operates according to the setting as described above (S730). Data generated while the home appliance operates is stored in the memory 145 or is stored as temporary data in the storage device 146 (S735).

When power is cut during operation of the home appliance (S740), for example, when power is not supplied due to a power blackout or when power is forcibly cut to protect the home appliance due to power abnormality, the main controller 141 stores diagnostic data including power information about power abnormality or power blackout and state information about the current operation in the memory 145 (S745).

Here, since current stored in a power circuit of the home appliance remains after power is cut, the main controller 141 stores the diagnostic data using the stored current.

When stored current remains in the power circuit (S750), the main controller 141 stores the diagnostic data by performing the data storage operation as described above (S745 to S750).

When there is no current stored in the power circuit, all operations of the home appliance are automatically stopped and the power thereof is automatically turned off due to discharge (S755).

Here, it is preferable that most operations of the home appliance be immediately stopped and current stored in the power circuit be used for data storage when the power is cut for the causes described above.

Figure 12:
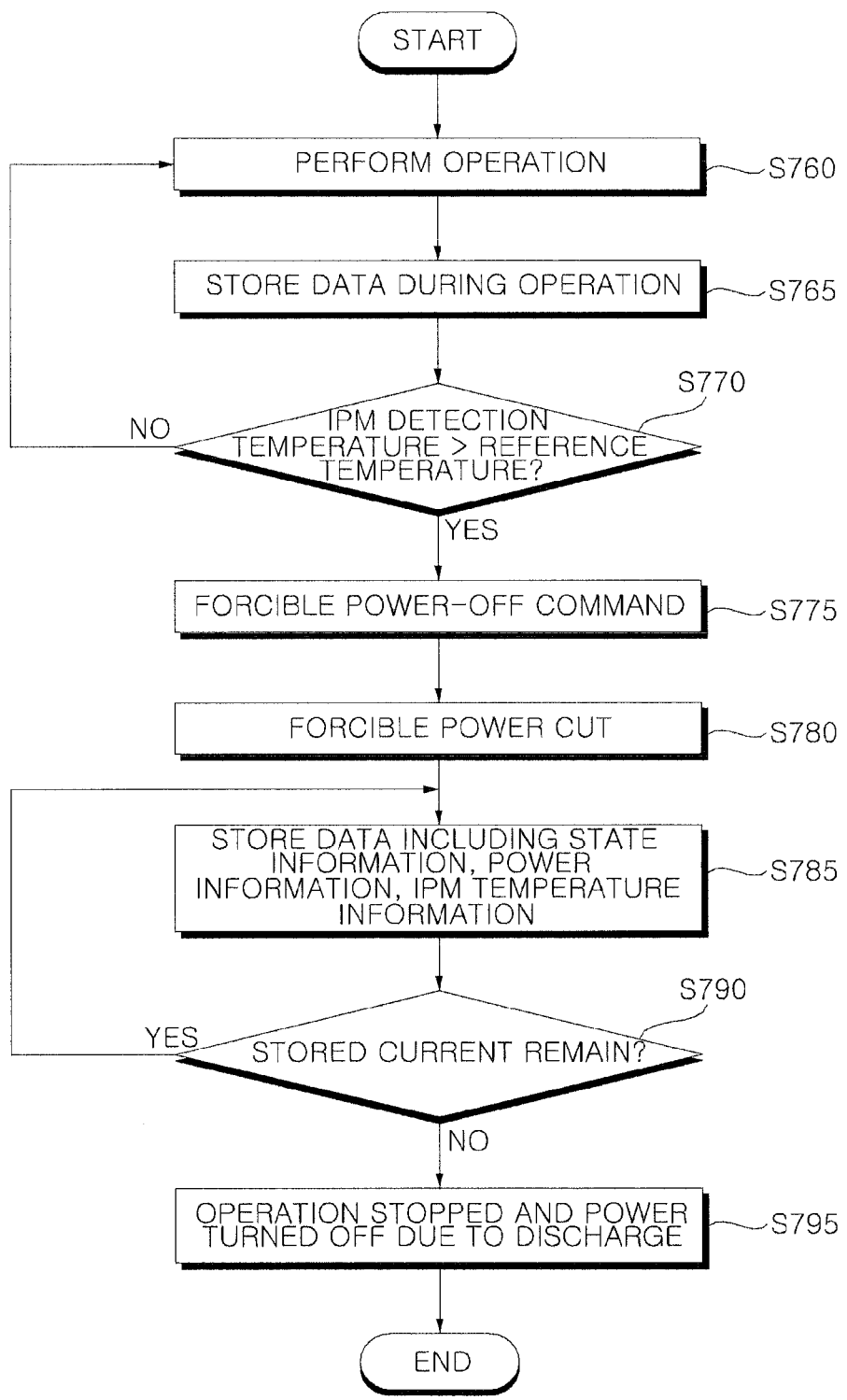
FIG. 12 is a flow chart illustrating a method for storing data according to an operation state of a home appliance according to the present invention.

FIG. 12 is a flow chart illustrating a method for storing data according to an operation state of a home appliance according to the present invention.

As shown in FIG. 12, the home appliance 101 operates according to the setting as described above (S760). Data generated while the home appliance operates is temporarily stored in the storage device 146 or is stored in the memory 145 at a specified time, depending on the type of the data (S765).

The main controller 141 receives information of each component of the home appliance such as pressure or temperature during operation of the home appliance 101 through the sensing device 170. Here, the main controller 141 determines the state of the home appliance according to the temperature value received through the sensing device 170. When the received temperature value is equal to or higher than a reference value (S770), the main controller 141 applies a forcible power-off command to a power device (S775).

The power device forcibly cuts off power in response to the control command from the main controller 141. The home appliance 101 stops operation due to forcible power cut.

Here, although power is cut, the home appliance 101 stores diagnostic data including state information, power information, and temperature information in the memory 145 using stored current remaining in the power circuit (S785).

When stored current remains in the power circuit (S790), the main controller 141 continues the data storage operation described above (S785 to S790).

When no stored current remains in the power circuit, all operations are stopped and power is turned off (S795).

In the present invention, data is stored and updated in an accumulated manner while data is stored when the home appliance has stopped operation in a sudden (or emergency) termination situation as described above and thus the stored data is output as a sound signal through the sound output device when the home appliance has entered the smart diagnosis mode.

As is apparent from the above description, the home appliance and a method for operating the same according to the present invention have a variety of advantages. For example, data required for fault diagnosis of the home appliance is stored while minimizing unnecessary data storage when a sound signal including product information is output, so that it is possible to efficiently store and manage data, increasing utilization efficiency of limited resources of the home appliance and enabling more accurate diagnosis of the home appliance.

In addition, even when the home appliance suddenly terminates operation in an emergency situation for an internal or external cause, product information is stored according to each situation so that it is possible to determine the cause of the sudden termination, thus enabling fault diagnosis of the home appliance while increasing fault diagnosis accuracy.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method for operating a home appliance, the method comprising:
   comparing, when an operation setting is input and an activation key is input, a post-error operation count with a reference count and maintaining stored diagnostic data included in product information when the post-error operation count is equal to or less than the reference count;
   starting operation of the home appliance according to the operation setting and temporarily storing data generated during the operation;
   discarding the temporarily stored data and maintaining the diagnostic data when the operation is completed according to the operation setting;
   storing, when an error has occurred before the operation is completed, the temporarily stored data as the diagnostic data to update the diagnostic data using data regarding the error;
   generating, when a command to perform fault diagnosis is input, the product information using the diagnostic data and encoding and modulating the product information and then outputting the product information as a sound signal through a sound output device;

initializing the diagnostic data excluding count related data when the post-error operation count has exceeded the reference count; and temporarily storing data generated during the operation according to the operation setting after initializing the diagnostic data and storing the temporarily stored data as the diagnostic data in a memory when an initial operation time has elapsed.

2. The method according to claim 1, further comprising:
storing an error code corresponding to the error and data associated with the error code as the diagnostic data and outputting an alert about the error.

3. The method according to claim 1, wherein the post-error operation count is incremented by one when the activation key is input and is initialized when an error has occurred.

4. The method according to claim 1, further comprising:
storing the data temporarily stored during the operation as the diagnostic data and stopping the operation when the operation is terminated as all set operation modes are normally completed without error occurrence.

5. The method according to claim 1, wherein, when data having a common attribute is generated or changed during the operation, the data having the common attribute is immediately stored as the diagnostic data.

6. A home appliance comprising:
a selector to input a command to perform fault diagnosis;
a memory to store at least one diagnostic data included in product information of the home appliance for the fault diagnosis;
a controller to store data generated during operation of the home appliance as the diagnostic data in the memory, create the product information using the diagnostic data when a command to perform fault diagnosis is input through the selector, and encode the product information to generate a digital signal including a plurality of frames;
a modulator to generate a frequency signal corresponding to the digital signal; and
a sound output device driven by the modulator to output a sound signal corresponding to the frequency signal, wherein, when an error occurrence history is present, the controller temporarily stores the data generated during the operation and discards the temporarily stored data and maintains the stored diagnostic data when the operation is terminated normally, and stores the temporarily stored data as the diagnostic data when an error has occurred during the operation and wherein, when a command to perform fault diagnosis is input through the selector, the controller controls the modulator and the sound output device to output the product information as a sound signal through the sound output device;

wherein the controller stores information including at least one of temporary data, state information, an error code, option information, and power information as diagnostic data when a sudden operation termination has occurred and generates the product information using the diagnostic data to output the sound signal when the command to perform the fault diagnosis is input;

wherein, when the operation is terminated due to power blackout, power cut, forcible operation termination, the controller stores the state information and the power information as the diagnostic data using a remaining stored current until the remaining current is completely discharged.

7. The home appliance according to claim 6, wherein the controller determines that the error occurrence history is present and maintains the diagnostic data when a post-error operation count included in the diagnostic data is equal to or less than a reference count, and the controller determines that the error occurrence history is not present and initializes the diagnostic data when the post-error operation count is equal to or less than the reference count.

8. The home appliance according to claim 7, wherein, when an error occurrence history is not present, the controller immediately stores the data generated during the operation as the diagnostic data or stores the data as the diagnostic data when a predetermined operation is completed after temporarily storing the data, depending on an attribute of the data, and the controller stores the option information, the error code, the state information, and the temporary data associated with a currently performed operation step as the diagnostic data when the operation is terminated in response to an input during the operation.

* * * * *